US012579054B2

(12) United States Patent
Wan et al.

(10) Patent No.: US 12,579,054 B2
(45) Date of Patent: Mar. 17, 2026

(54) APPLICATION PROGRAMMING INTERFACE TEST METHOD AND APPARATUS

(71) Applicant: Huawei Cloud Computing Technologies Co., Ltd., Guizhou (CN)

(72) Inventors: Ruiyuan Wan, Beijing (CN); Shiliang Xiao, Gui'an (CN); Dandan Ji, Shanghai (CN); Minli Bao, Gui'an (CN); Shiheng Xu, Hangzhou (CN); Yi Liu, Singapore (SG); Yuekang Li, Singapore (SG); Yang Liu, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 283 days.

(21) Appl. No.: 18/366,600

(22) Filed: Aug. 7, 2023

(65) Prior Publication Data

US 2023/0376408 A1 Nov. 23, 2023

Related U.S. Application Data

(63) Continuation of application No. PCT/CN2022/073096, filed on Jan. 21, 2022.

(30) Foreign Application Priority Data

Feb. 26, 2021 (CN) .......................... 202110220017.8

(51) Int. Cl.
*G06F 11/3668* (2025.01)

(52) U.S. Cl.
CPC ...... *G06F 11/3688* (2013.01); *G06F 11/3684* (2013.01)

(58) Field of Classification Search
None
See application file for complete search history.

(56) References Cited

U.S. PATENT DOCUMENTS 11,467,887 B1 * 10/2022 Caudill .................. G06F 9/541
12,073,263 B1 * 8/2024 Thompson ................ G06F 9/54
(Continued)

FOREIGN PATENT DOCUMENTS

CN        106339312 A        1/2017
CN        109189666 A        1/2019
(Continued)

OTHER PUBLICATIONS

Viglianisi Emanuele et al: "RESTTESTGEN: Automated Black-Box Testing of RESTful APIs", 2020 IEEE 13th International Conference on Software Testing. Validation and Verification (ICST), IEEE, Oct. 24, 2020 (Oct. 24, 2020), pp. 142-152. XP033807400.
(Continued)

*Primary Examiner* — Philip Wang

(57) ABSTRACT

In a method of application programming interface (API) testing, a computing device obtains an API file transmitted by a user, parses the API file, and generates an API operation relationship graph and a test oracle. The computing device generates a first test case set based on the API operation relationship graph, and triggers a service node to execute a test case in the first test case set. The computing device obtains an API request initiated in a process of executing the test case in the first test case set and a corresponding API response, and provides the user with a matching status between the test oracle and the API request initiated in the process of executing the test case in the first test case set and the API response.

16 Claims, 14 Drawing Sheets

(56) References Cited

U.S. PATENT DOCUMENTS

| | | | | |
|---|---|---|---|---|
| 2010/0057693 A1* | 3/2010 | Himstedt | ........... | G06F 11/3672 |
| | | | | 707/E17.005 |
| 2016/0011960 A1* | 1/2016 | Krishna | ............. | G06F 11/3698 |
| | | | | 717/135 |
| 2018/0314622 A1* | 11/2018 | Lowe | .................. | G06F 11/3616 |
| 2020/0117583 A1* | 4/2020 | Durairaj | ............. | G06F 11/3692 |
| 2024/0411671 A1* | 12/2024 | Jiang | ................... | G06F 11/3684 |
| 2025/0225059 A1* | 7/2025 | Bi | ....................... | G06F 11/3684 |

FOREIGN PATENT DOCUMENTS

| | | | | | | |
|---|---|---|---|---|---|---|
| CN | 110968505 A | * | 4/2020 | | .......... | G06F 11/3692 |
| CN | 112559348 A | * | 3/2021 | | .......... | G06F 11/3692 |
| CN | 113722228 A | * | 11/2021 | | .......... | G06F 11/3688 |

OTHER PUBLICATIONS

Emanuele Viglianisi et al., "RESTTESTGEN: Automated Black-Box Testing of RESTful APIs", 2020 IEEE 13th International Conference on Software Testing, Validation and Verification (ICST), total 11 pages.

\* cited by examiner

GET-/vl/chaos_inst_dragon/schedule/schedules page_size=10 page_no=1 CR LF
GET-/vl/tc/service_name env_id=3 CR LF
GET-/vl/luban_alert/build_index_value_history index_name=total_time
sub_type=ALL ordering=finish_time CR LF
GET-/vl/e2ekanban/servicePipelineReport serviceFieldSn=DOI0048434 CR LF
GET-/vl/qualityreport/furion_data/kanban starttime=-5m CR LF
GET-/vl/chaos_dispatcher/basic_config/app_fault_list agencyid=h00511928 CR LF
GET-/vl/chaos_dispatcher/basic_config/app_fault_list sub_business_name=CodeHub
business_name=CodeHub CR LF
GET-/vl/e2ekanban/engineerReportFieldIndexValue
indexType=BUILD_GATE_IS_CONFIG CR LF
GET-/vl/qualityreport/ticket_service_name location=DevCloud
field=inpacted_services CR LF
GET-/vl/knowledge/reliability_content agencyid=100556885 CR LF
GET-/vl/chaos_dispatcher/basic_config/service_configs/get_app_list svc=CodeHub
agencyid=z00464114 product=30 CR LF

FIG. 4D

FIG. 4E

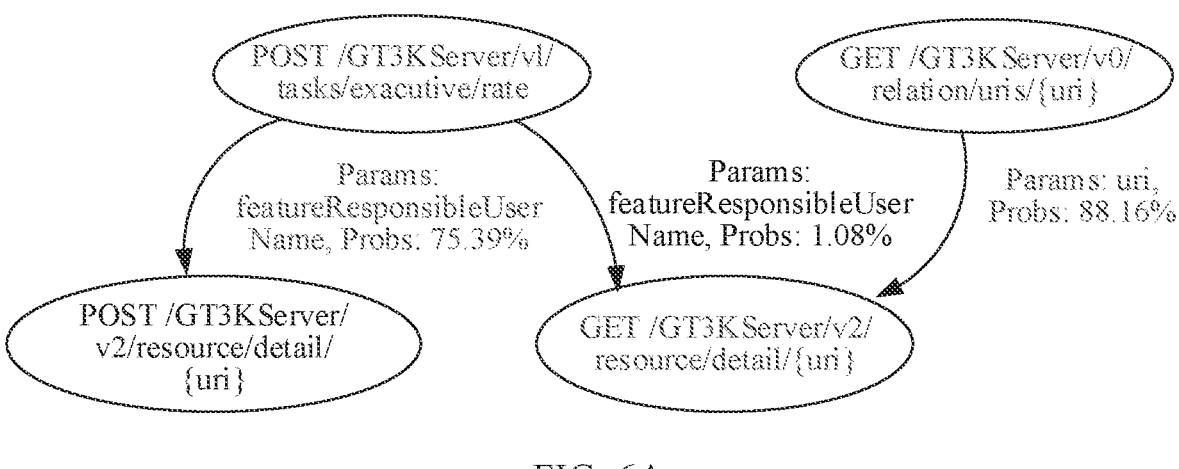

FIG. 6A

GET-/v1/chaos_inst_dragon/schedule/schedules page_size=10 page_no=1 CR LF
GET-/v1/tc/service_name env_id=3 CR LF
GET-/v1/luban_alert/build_index_value_history index_name=total_time
sub_type=ALL ordering=finish_time CR LF
GET-/v1/e2ekanban/servicePipelineReport serviceFieldSn=DO10048434 CR LF
GET-/v1/qualityreport/furion_data/kanban starttime=-5 CR LF
GET-/v1/chaos_dispatcher/basic_config/app_fault_list agencyid=h00511928 CR LF
GET-/v1/chaos_dispatcher/basic_config/app_fault_list sub_business_name=CodeHub
business_name=CodeHub CR LF
GET-/v1/e2ekanban/engineerReportFieldIndexValue
indexType=BUILD_GATE_IS_CONFIG CR LF
GET-/v1/qualityreport/ticket_service_name location=DevCloud
field=impacted_services CR LF
GET-/v1/knowledge/reliability_content agencyid=100556885 CR LF
GET-/v1/chaos_dispatcher/basic_config/service_configs/get_app_list svc=CodeHub
agencyid=z00464114 product=30 CR LF

FIG. 6B

APPLICATION PROGRAMMING INTERFACE TEST METHOD AND APPARATUS

CROSS-REFERENCE TO RELATED APPLICATIONS

This application is a continuation of International Application PCT/CN2022/073096, filed on Jan. 21, 2022, which claims priority to Chinese Patent Application 202110220017.8, filed on Feb. 26, 2021. The disclosures of the aforementioned priority applications are hereby incorporated by reference in their entirety.

TECHNICAL FIELD

This application relates to the field of communication technologies, and in particular, to an application programming interface (API) test method and apparatus.

BACKGROUND

Under the wave of software architectures evolving towards cloud and service, the use of application programming interfaces (APIs) gradually becomes a main way of function entry of software. With wide applications of the API, performance of the API affects operating of software. In order to find defects of the API in time, the API needs to be tested.

An API test is also referred to as an interface test. A test object is an API, which is used to verify whether the API meets function, performance, reliability, and security requirements.

Currently, API test methods are not effective, and their automation level is limited.

SUMMARY

This application provides an application programming interface (API) test method and apparatus, to improve API test efficiency and implement automatic API testing.

According to a first aspect, an embodiment of this application provides an application programming interface (API) test method. The method may be performed by an API test apparatus. In the method, the API test apparatus may first obtain an API file transmitted by a user. For example, the user may directly operate the API test apparatus, and upload the API file to the API test apparatus. For another example, the user may send the API file to the API test apparatus by using a client deployed on a user side. The API file may be an API definition document, or may be API traffic data, or may include both an API definition document and API traffic data. The API definition document includes API description information, and the API traffic data includes an API request initiated when an API is invoked and an API response corresponding to the API request.

After obtaining the API file, the API test apparatus may parse the API file, to generate an API operation relationship graph and a test oracle, where the API operation relationship graph describes a dependency relationship of API operations, and the test oracle is a prediction rule of the API request initiated when the API is invoked and the corresponding API response. Then, the API test apparatus may generate a first test case set based on the API operation relationship graph, where the first test case set includes at least one test case. Then, the API test apparatus may send a test case in the first test case set to a service node, instruct the service node to execute the test case, and obtain an API request initiated by the service node in a process of executing the test case in the first test case set and a corresponding API response. After obtaining the API request initiated by the service node in the process of executing the test case in the first test case set and the corresponding API response, the API test apparatus may analyze the API request initiated by the service node in the process of executing the test case in the first test case set and the corresponding API response, determine a matching status between the test oracle and the API request initiated by the service node in the process of executing the test case in the first test case set and the corresponding API response, and further provide a test report to a user. The test report includes the matching status between the test oracle and the API request initiated in the process of executing the test case in the first test case set and the corresponding API response. Optionally, the test report further includes a first test case set.

According to the foregoing method, an entire process of test case generation, triggering test case execution, and test report displaying is completed by the API test apparatus without human participation. This can efficiently complete an API test process. By providing the test report for the user, the user can learn about API test status timely and conveniently. This effectively improves user experience.

In a possible implementation, the API test apparatus may perform a plurality of rounds of iterations, and each round of iteration takes an output of a previous round of iteration as an input. The following uses a subsequent round of iteration as an example for description.

The API test apparatus may determine, from the first test case set based on the test oracle, a target test case that does not match the test oracle, where not matching the test oracle means that an API request initiated when the target test case is executed and an API response do not match the test oracle; then, analyze the target test case, mine a new dependency relationship between API operations from the test case, and update the dependency relationship to the API operation relationship diagram. Then, the API test apparatus generates a second test case set based on an updated API operation relationship graph; triggers the service node to execute a test case in the second test case set, and obtains an API request initiated by the service node in a process of executing the test case in the second test case set and an API response; and provides the user with a matching status between the test oracle and the API request initiated in the process of executing the test case in the second test case set and the corresponding API response. In other words, the test report provided to the user may further include the matching status between the test oracle and the API request initiated in the process of executing the test case in the second test case set and the corresponding API response, and may further include the second test case set.

According to the foregoing process, a test case that does not match the test oracle can be determined in a test case set generated in each round of iteration (for example, the first test case set and the second test case set). Based on this test case, the operation relationship graph can be updated, and the updated operation relationship graph can be used in a next round of iteration. This is repeated until a preset number of iterations or iteration time is reached.

According to the foregoing method, a relatively rich dependency relationship between API operations can be mined through the plurality of rounds of iterations, and a corresponding test case can be generated to test the API, so that a test process is more accurate. This ensures accuracy of API testing.

In a possible implementation, when the API file includes the API traffic data, when the API test apparatus parses the API file, the API test apparatus may generate the API operation relationship graph and a parameter constraint dictionary, where the parameter constraint dictionary includes a value range of an API parameter. That is, the parameter constraint dictionary records possible values of an input parameter and an output parameter of the API, for example, parameters in the API request.

According to the foregoing method, the API test apparatus can mine, from the API traffic data, the possible values of the API parameters in an actual API invoking process, to facilitate subsequent generation of a test case and ensure validity of the test case.

In a possible implementation, a parameter of an API request defined by a test case in the first test case set complies with the parameter constraint dictionary. The test case records a parameter data instance of the API request. The parameter data instance records a specific value of a parameter in the API request. The specific value may be a value recorded in the parameter constraint dictionary.

According to the foregoing method, the parameter constraint dictionary is used to constrain the parameter of the API request defined by the test case. This can ensure that authenticity and validity of the API request, and, as much as possible, can ensure that a test case does not fail due to an incorrect parameter value in an execution process.

In a possible implementation, in addition to transmitting the API file, the user may further send configuration information to the API test apparatus, where the configuration information indicates a rule that needs to be followed by a test case, and the configuration information includes some or all of the following information:

a test scenario of the test case, an API blocklist or trustlist, an API parameter blocklist or trustlist, and information indicating whether to provide coverage information of a test case.

According to the foregoing method, the user can configure a rule that needs to be followed by the test case, to ensure that a generated test case meets a requirement of the user, and a test direction can be close to a test direction expected by the user. In this way, a finally generated test report can meet the requirement of the user, ensuring user experience.

In a possible implementation, the test case in the first test case set complies with the configuration information.

In a possible implementation, the API test apparatus may further determine coverage information of the test case in the first test case set, where the coverage information of the test case describes a coverage status of the test case on the API; and provide the coverage information of the test case to the user. The test report may also include the coverage information of test case in the first test case set.

According to the foregoing method, the coverage information of the test case can reflect performance of the test case to some extent, which is convenient for the user to understand performance of the test case. In this way, the user can select a test case from test cases, to produce a test case script, so as to facilitate reuse.

In a possible implementation, the API test apparatus may further perform another iteration manner. In this iteration manner, the API test apparatus may also perform a plurality of rounds of iterations, and each round of iteration takes an output of a previous round of iteration as an input. The following uses a subsequent round of iteration as an example for description.

The API test apparatus may determine a candidate test case set from the first test case set, where coverage information of a test case in the candidate test case set meets a preset coverage condition, for example, select a test case of which coverage information meets a requirement as the test case in the candidate test case set; then, generate a derivative test case set based on the candidate test case set, for example, generate a derivative test case set based on a genetic algorithm (for example, cross mutation); and then trigger the service node to execute a test case in the derivative test case set, and obtain an API request initiated by the service node in a process of executing the test case in the derivative test case set and an API response.

The API test apparatus may determine a matching status between the test oracle and the API request initiated in the process of executing the test case in the derivative test case set and the corresponding API response, and provide the user with the matching status between the test oracle and the API request initiated in the process of executing the test case in the derivative test case set and the corresponding API response. That is, the test report further includes the matching status between the test oracle and the API request initiated in the process of executing the test case in the derivative test case set and the corresponding API response, and may further include the derivative test case set.

That is, in each round of iteration process, a derivative test case set can be generated based on a test case set (for example, the first test case set and the second test case set) generated in each round of iteration process, and then a test case in the derivative test case set can be executed.

According to the foregoing method, a new test case may be generated based on a test case in an existing test case set, and a dependency relationship that may exist in APIs can be explored, thereby ensuring that the API testing is more comprehensive.

According to a second aspect, an embodiment of this application further provides an API test apparatus. The API test apparatus has a function of implementing behaviors in the method instance of the first aspect. For beneficial effects, refer to descriptions of the first aspect. Details are not described herein again. The function may be implemented by hardware, or may be implemented by hardware by executing corresponding software. The hardware or the software includes one or more modules corresponding to the foregoing function. In a possible design, a structure of the apparatus includes an obtaining module, a parsing module, a generation module, a collecting module, and a providing module. These modules may perform corresponding functions in the method example in the first aspect. For details, refer to detailed descriptions in the method example. Details are not described herein again.

According to a third aspect, this application further provides a computing device. The computing device includes a processor and a memory, and may further include a communication interface. The processor executes program instructions in the memory to perform the method provided in any one of the first aspect or the possible implementations of the first aspect. The memory is coupled to the processor, and stores program instructions and data that are necessary in a process of testing an application programming interface. The communication interface is configured to communicate with another device, for example, obtain an API file, send a test report, or send a test case.

According to a fourth aspect, this application provides a computing device system. The computing device system includes at least one computing device. Each computing device includes a memory and a processor. The processor of the at least one computing device is configured to access code in the memory to perform the method according to any one of the first aspect or the possible implementations of the first aspect.

According to a fifth aspect, this application provides a non-transitory readable storage medium. When the non-transitory readable storage medium is executed by a computing device, the computing device performs the method provided in any one of the first aspect or the possible implementations of the first aspect. The storage medium stores a program. The storage medium includes but is not limited to a volatile memory, for example, a random access memory, and a nonvolatile memory, for example, a flash memory, a hard disk drive (HDD), or a solid state drive (SSD).

According to a sixth aspect, this application provides a computing device program product, where the computing device program product includes computer instructions, and when the computer instructions are executed by a computing device, the computing device performs the method provided in any one of the first aspect or the possible implementations of the first aspect. The computer program product may be a software installation package. When the method provided in any one of the first aspect or the possible implementations of the first aspect needs to be used, the computer program product may be downloaded and executed on a computing device.

BRIEF DESCRIPTION OF DRAWINGS

FIG. 4D is a schematic diagram of a test case according to this application;

FIG. 4E is a schematic diagram of a method for generating a test case according to this application;

FIG. 6A is a schematic diagram of an ODG according to this application;

FIG. 6B is a schematic diagram of a test case according to this application;

DESCRIPTION OF EMBODIMENTS

Figure 1A:
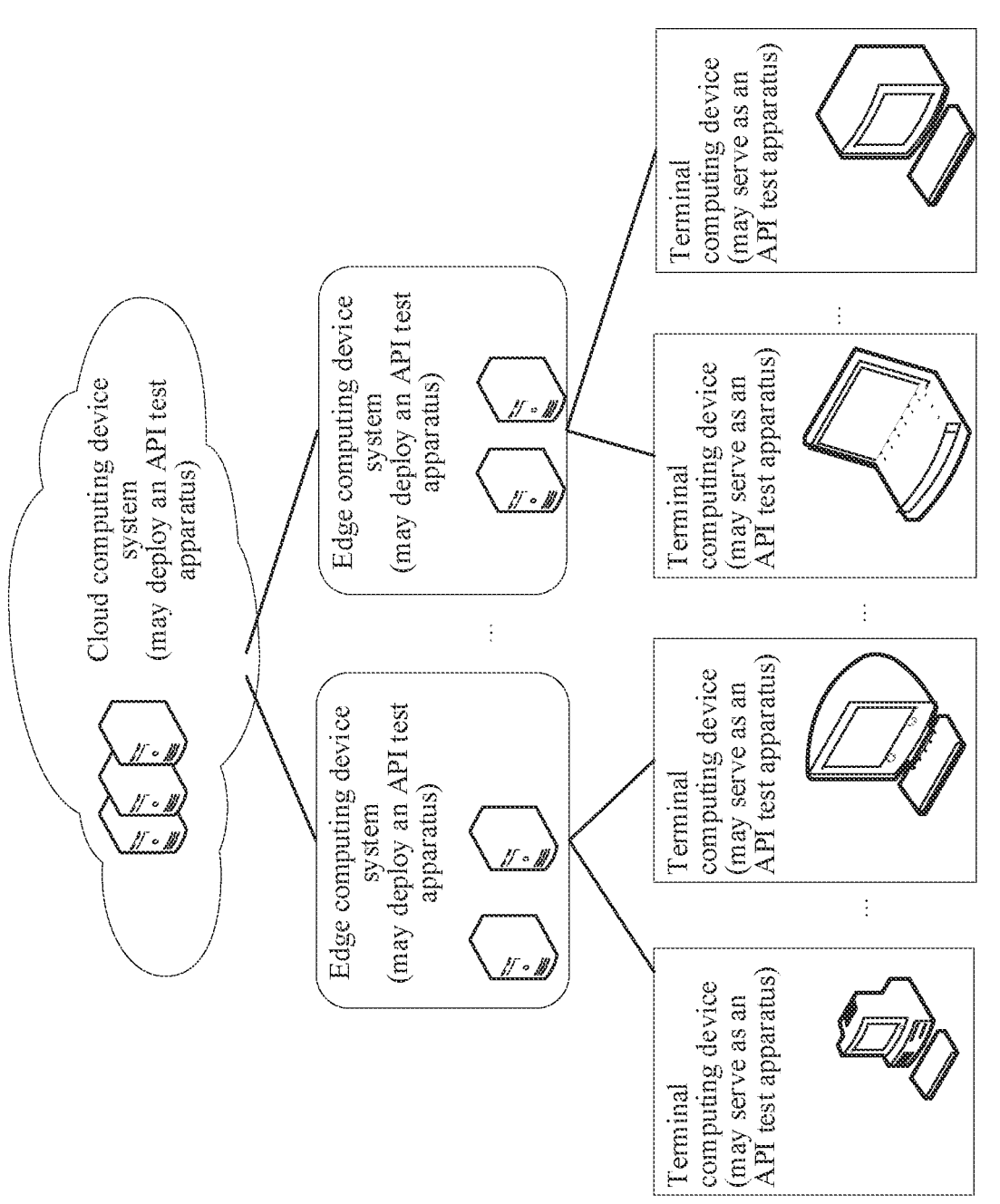
FIG. 1A is a schematic diagram of an architecture of a system according to this application.

Before an application programming interface test method provided in embodiments of this application is described, concepts in embodiments of this application are first described.

(1) API Definition Document

The API definition document includes API description information, for example, a resource identifier (for example, an identifier of an element on a web page) invoked by an API, an API parameter definition (for example, an input parameter structure and an output parameter schema), and a resource operation method and a parameter constraint in the API (for example, a data value range or a value of an API parameter is specified.) One API definition document can describe one or more APIs.

A RESTful API definition document is used as an example. The API definition document records an API method name, a resource address, a message body of an API request and an API response (also referred to as a message format of the API request and API response), and a status code carried in the API response. The resource address may be a uniform resource locator (URL) of a resource.

(2) Test Case

In embodiments of this application, the test case is a test case used to test an API. The test case describes a sequence of steps performed in an API operation, and a parameter data instance of an API request initiated in each step. The parameter data instance indicates a specific value of each parameter in the API request.

(3) API Traffic Data

The API traffic data records an API request and a corresponding API response sent when nodes in a production environment or a production-like environment invoke an API for interaction.

The API request is a request message sent by a transmitter (for example, a client) to a receiver (for example, a server), and includes content such as a request address, a request method, a request message header, a request parameter, and a request message body.

The API response is a feedback message sent from the receiver to the transmitter (client), and includes a response status code, a response header, and a response body.

(4) API Operation

The API operation means an operation method performed on a resource by invoking an API. API operations are classified into creating, reading, updating, and deleting, and complying with the create, read, update, and delete (CRUD) semantics, that is, describing rules for creating, obtaining, modifying, and deleting a resource. The API operation may also be not limited to creating, obtaining, modifying, and deleting, and the like. An API can be regarded as an API operation.

A RESTful API is used as an example. A resource obtaining operation is GET. A resource creating operation is to send PUT to a new resource (for example, a resource URL) or POST to an existing resource (for example, a resource URL).

A resource replacing operation may be sending PUT to an existing resource. A resource modifying operation (for example, modifying some attributes of a resource) can be sending PATCH to an existing resource. A resource deleting operation may be sending DELETE to an existing resource.

(5) API Operation Relationship Graph

The API operation relationship graph describes a dependency relationship between API operations. A specific type of the API operation relationship graph is not limited in embodiments of this application. For example, the API operation relationship graph may be an operation dependency graph (ODG) or an operation transfer probability graph (OTPG).

An ODG describes a dependency relationship between different API operations. An OTPG may also describe a dependency relationship between API operations. Different from the ODG, the OTPG further records a transfer probability between the API operations, that is, a probability of performing another operation after one API operation is executed.

The dependency relationship between the different API operations may be represented as a dependency relationship obtained when different API operations are performed on a same resource, or may be represented as an association between parameters (for example, an input parameter or an output parameter of an API) of the different API operations.

For example, a RESTful API is used as an example. A dependency relationship between API operations may comply with static data in an API definition file, and may comply with a resource CRUD semantic rule. For example, a resource obtaining operation (GET) depends on a resource creating operation (PUT). Alternatively, an input parameter value of a resource operation of API A depends on a response parameter value of a resource operation of API B. For example, an input parameter petId in an interface operation GetPetById depends on a response parameter petId of an interface operation getPets.

The operation transfer probability graph is derived from API traffic data. The API traffic data may be truncated according to a specific rule (for example, user or day), and then transfer probabilities of operations that are of APIs that have parameter dependencies in all previous and subsequent API operations in the API traffic data are calculated. For example, RESTful interfaces B, C, and D are parameter-dependent on an interface A, and A→B occurs 700 times, and A→C appears 200 times and A→D appears 100 times, a transfer probability of A→B is 70%, a transition probability of A→C is 20%, and a transition probability of A→D is 10%.

(6) Test Oracle

The test oracle describes a prediction rule of an API request initiated when an API is invoked and an API response corresponding to the API request. In embodiments of this application, the test oracle includes some or all of the following: a rule that needs to be followed by a pre-predicted API request and an API response corresponding to the API request, a distribution status of an input parameter and an output parameter of the pre-predicted API, and a parameter constraint.

A rule (which may be referred to as an explicit test oracle) that needs to be followed by the API request and the API response corresponding to the API request may be determined based on an API definition document.

Based on the API definition document, the explicit test oracle can be derived. A RESTful API is used as an example. Determining whether a response status code (2XX, 4XX, and 5XX) meets an expectation on the premise that a standard definition is met is an explicit test oracle. For example, under a normal input parameter condition, an expected result of the status code is 2XX. Under an abnormal input parameter condition, an expected result of the status code is 4XX. If 5XX is returned, the status code is invalid. In addition, input and output parameter schemata (schema) clearly defined in the API definition document, including an interface parameter name, a type, a value range, and an enumerated value range of a parameter, and whether the parameter is mandatory, can also be used as an explicit test oracle.

Based on API traffic data, implicit test oracles such as normal distribution of an input parameter and an output parameter of the API and a constraint between parameters can be determined.

The distribution status of the input parameter and the output parameter of the API may include some or all of the following:

a range that is of the API output parameter and that can specify maximum and minimum values of the output parameter;

a probability distribution of the API output parameter, that is, probabilities of output parameters with different values;

a mapping relationship between the input parameter and the output parameter of the API, where an input parameter A and an output parameter B are used as an example, and a mapping relationship between the input parameter A and the output parameter B may indicate a magnitude relationship between the input parameter A and the output parameter B, for example, the input parameter A>output parameter B, the input parameter A=output parameter B, and the input parameter A<output parameter B, and may further indicate that when the input parameter A is equal to a first value or falls within a first range, the output parameter B is equal to a second value or falls within a second range; and an association relationship between the input parameter and the output parameter of the API, where an input parameter A and an output parameter B are used as an example, and the association relationship between the input parameter A and the output parameter B may be that the input parameter A and the output parameter B appear at the same time, any one of the input parameter A and the output parameter B appears, or the input parameter A and the output parameter B cannot appear at the same time.

An application programming interface test case generation method provided in embodiments of this application may be performed by an API test apparatus, and the API test apparatus may be a hardware apparatus, for example, a server, a terminal computing device, and the like, or may be a software apparatus, and is specifically a set of software system running on a hardware computing device. A location at which the API test apparatus is deployed is not limited in embodiments of this application. For example, as shown in FIG. 1A, the API test apparatus may run in a cloud computing device system (including at least one cloud computing device, for example, a server or the like), or may run in an edge computing device system (including at least one edge computing device, for example, a server, a desktop computer, or the like), or may run on various terminal computing devices, such as: a laptop, a personal desktop computer, and the like.

Figure 1B:
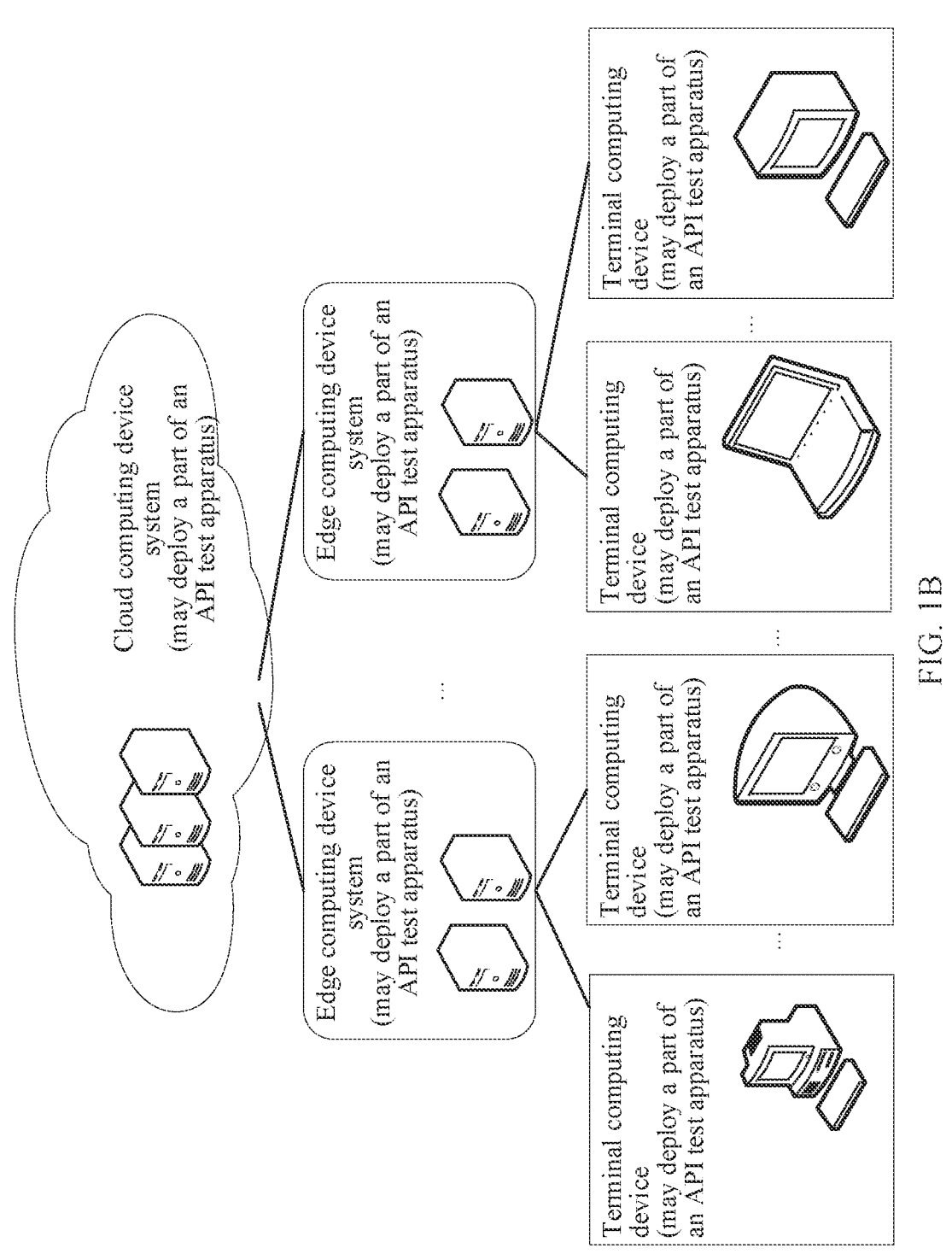
FIG. 1B is a schematic diagram of an architecture of a system according to this application.

Logically, the API test apparatus may alternatively be an apparatus including a plurality of modules. For example, the API test apparatus may include an obtaining module, a parsing module, a collecting module, and a providing module. Components in the API test apparatus may be separately deployed in different systems or servers. For example, as shown in FIG. 1B, the components of the apparatus may run separately in three environments: a cloud computing device system, an edge computing device system, and a terminal computing device, or may run in any two of the three environments. The cloud computing device system, the edge computing device system, and the terminal computing device are connected through a communication path, and may perform communication and data transmission with each other. The application programming interface (API) test method provided in embodiments of this application is performed by combining components of the API test apparatuses running in the three environments (or any two of the three environments) in cooperation.

A deployment manner of the API test apparatus is not limited in embodiments of this application. For example, the API test apparatus may be an application deployed in a cloud, and can provide a cloud service for a user. In other words, the API test apparatus may be deployed in an edge computing device system or a cloud computing system. The user may obtain the cloud service from the API test apparatus by using a client deployed on a user side. The API test apparatus may alternatively be a terminal computing device deployed close to the user side. For example, the API test apparatus may be an application software on the terminal computing device, or may be a plug-in of an application software on the terminal computing device.

Figure 2:
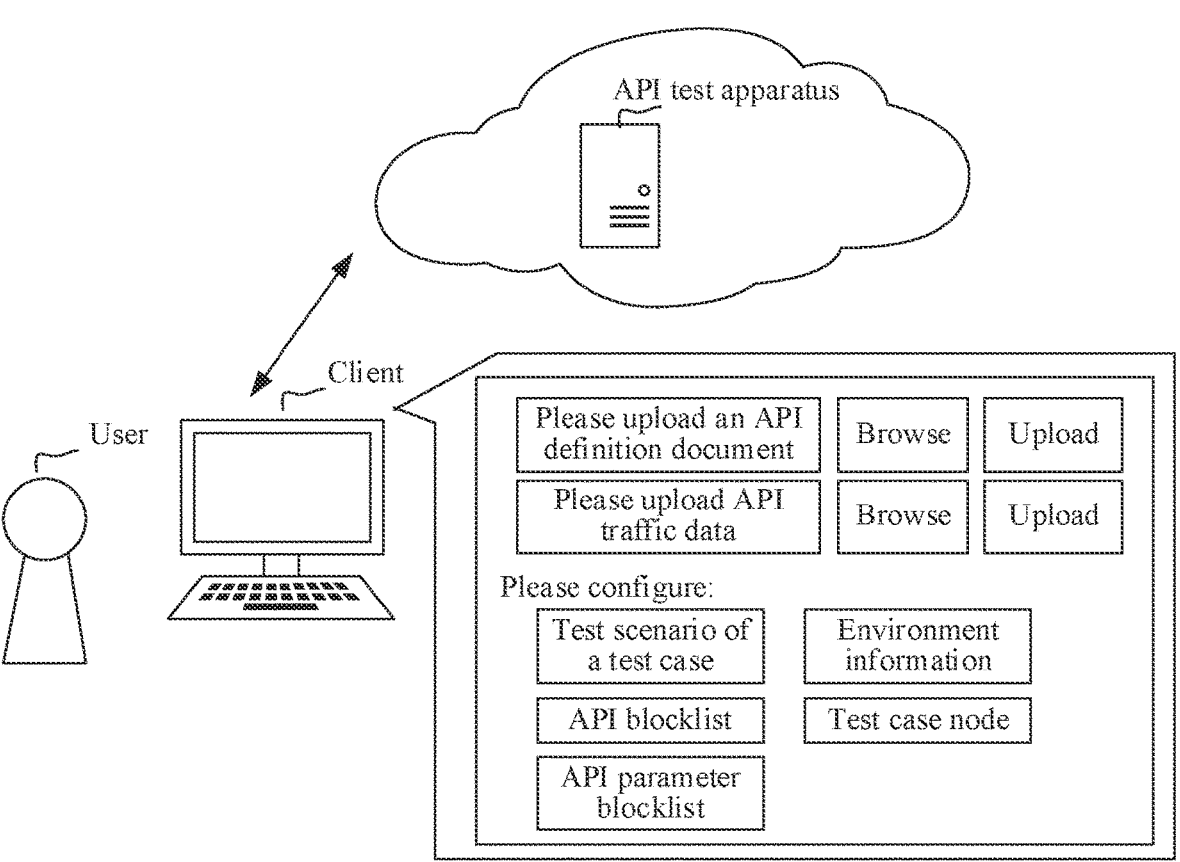
FIG. 2 is a schematic diagram of a scenario according to this application.

With reference to accompanying drawings, the following describes an application scenario to which a relationship between a user, an API test apparatus, and a client is applicable. Refer to FIG. 2.

In FIG. 2, an interface presented by a display of a client to a user is drawn for example. The user may perform an operation on the client by using an external input/output apparatus (an apparatus such as a display, a keyboard, and a mouse). For example, the user can create a test task, upload an API definition document, and upload API traffic data on the client. The user can also configure a test case on the client, for example, configure information such as a test scenario of a test case, a blocklist or trustlist of an API, a blocklist or trustlist of an API, a domain name of a tested service environment, and an adopted computing node (which may be referred to as environment information for short).

The API test apparatus can monitor an operation of the user on the client, generate a test case and a test oracle based on an API file uploaded by the user and configuration of a test case, trigger a service node to execute the test case, collect an API request initiated when the test case is executed and a corresponding API response, determine a matching status between the API request initiated when the test case is executed and the corresponding API response and the test oracle, and provide the user with a matching status between the API request initiated when the test case is executed and the corresponding API response and the test oracle, that is, perform the application programming interface test method provided in embodiments of this application.

In this embodiment of this application, the API test apparatus may obtain the API definition document and/or the API traffic data, generate a test case and a test oracle based on configuration of the user, execute the test case, and provide the user with a matching status between the API request initiated during a process of executing the test case and the corresponding API responses and the test oracle. In the manner in this embodiment of this application, test case generation and test case execution can be automatically completed, and no human intervention is required. This can effectively improve test case generation efficiency and execution efficiency. In addition, in this embodiment of this application, an execution result of the test case, that is, the matching status between the API request initiated when the test case is executed and the corresponding API response and the test oracle, can be further fed back to the user, to feed back an execution status of the test case, thereby improving user experience.

In other words, there may be three manners of generating a test case in this embodiment of this application. A first manner is to generate a test case based only on an API definition document. A second manner is to generate a test case based only on API traffic data. A third manner is to generate a test case based on the API definition document and the API traffic data.

The API test method executed in the three manners is described as follows:

In the first manner, the API test apparatus generates the test case based on the API definition document.

In the first manner, after obtaining the API definition document, the API test apparatus generates an API operation relationship graph based on the API definition document, and generates the test case and a test oracle based on the API operation relationship graph and the configuration information of the user. The API test apparatus may further send the test case to a service node to trigger the service node to execute the test case, obtain an API request initiated by the service node in a process of executing the test case and a corresponding API response, and determine the API request and the corresponding API response to generate a test report, where the test report may include a matching status between the API request and the corresponding API response and the test oracle. Optionally, the test report may further include the test case and/or coverage information of the test case.

The API test apparatus may further provide the test report to the user by using a client, and the user confirms the test report. Alternatively, the API test apparatus may select the test case based on the test report, and generate a test case script, so that the test case can be reused.

Figure 3:
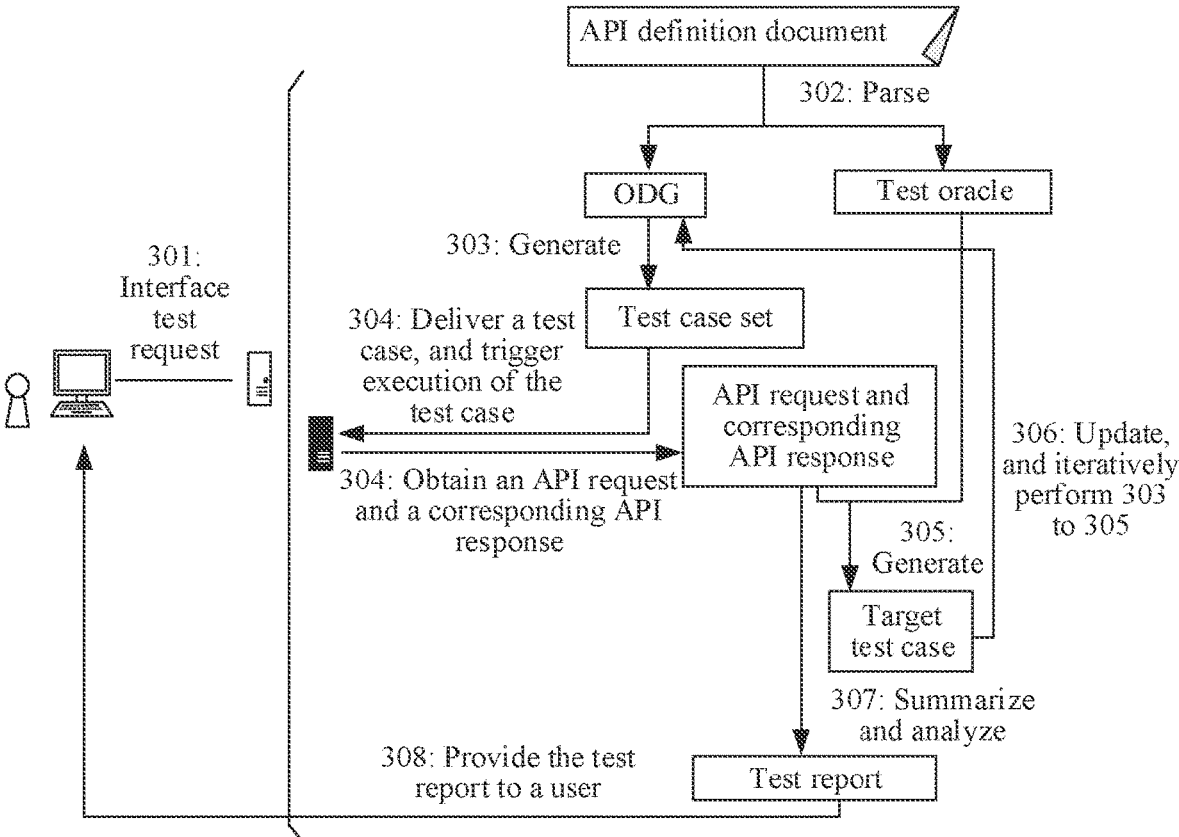
FIG. 3 is a schematic diagram of an API test method according to this application.

The following describes an application programming interface test method in this manner with reference to FIG. 3. The method includes the following steps.

Step 301: A user sends an interface test request to an API test apparatus by using a client, where the interface test request carries an API definition document. Optionally, the interface test request may further carry configuration information of the user.

The configuration information includes some or all of the following:

a test scenario of the test case, an API blocklist or trustlist, an API parameter blocklist or trustlist, environment information, information indicating whether to provide coverage information of the test case, project information, and component information.

The test scenario of the test case may indicate a scenario in which the test case is applied. For example, the test scenario of the test case may indicate that the test case is applied to a scenario in which an API is normally invoked (including a normal invoking sequence and a compliant input parameter). The test scenario of the test case may alternatively indicate that the test case is applied to a scenario of testing abnormal API invoking, that is, the test case is mainly used to test a scenario in which the API is invoked abnormally (including an abnormal invoking sequence such as disorder and an illegal input parameter request).

The API blocklist is a list of APIs that the test case does not need to detect. On the contrary, the API trustlist is a list of APIs that need to be detected in the test case.

The API parameter blocklist is a list of API parameters that the test case does not need to detect. On the contrary, the API parameter trustlist is a list of API parameters that need to be detected in the test case.

The environment information indicates a service environment in which the test case needs to be run, and a tested service environment of the test case may be indicated by using a tested service domain name, or an Internet protocol (IP) address and a port of a cluster node.

The coverage information of the test case describes coverage to an API by the test case, that is, describes an API that can be detected by the test case, and/or code or an element (an element such as a method, a class, or a branch) in the API. The coverage information of the test case may include coverage at different granularities, for example, coverage at an API granularity and coverage at a code granularity.

The coverage at an API granularity includes but is not limited to: a scenario coverage, an API method coverage (the API method coverage indicates a quantity of APIs that can be covered by the test case), and an API parameter coverage (the API parameter coverage indicates an API parameter that can be covered by the test case).

The scenario coverage means coverage of input generation and output parameter values and coverage of an API operation sequence that are obtained when a user or a test (beta) user that can be covered by the test case actually invokes an API.

The coverage at a code granularity includes but is not limited to: a code coverage (the code coverage indicates code that is of the API and that can be covered by the test case), a class coverage (the class coverage indicates a quantity of classes that are in the API and that can be covered by the test case), a method coverage (the method coverage indicates a quantity of methods that are in the API and that the test case can cover), a line coverage (the line coverage indicates a quantity of lines that are of code in the API and that can be covered by the test case), and a branch coverage (the branch coverage indicates a quantity of branches that are in the API and that the test case can cover). It should be noted that, the foregoing coverage is only an example. During specific application, the coverage information may alternatively include another type of coverage, and any coverage that can describe the coverage to an API by the test case is applicable to this embodiment of this application.

The project information refers to information such as a project number of a test object (such as a software service product version), and the component information refers to number and name information of an object under test (microservice or embedded component).

An execution manner of step 301 is not limited in this embodiment of this application. For example, the user may create a test task on the client, upload the API definition document, and select or enter the configuration information. After detecting an operation of the user, the client may send an interface test request to the API test apparatus.

In some scenarios, the interface test request may alternatively not carry the configuration information, and the configuration information may be preconfigured on the API test apparatus, that is, the configuration information may be default.

Step 302: After receiving the interface test request, the API test apparatus may parse the API definition document, to generate an ODG and a test oracle.

In step 302, the ODG and the test oracle need to be generated. The following separately describes generation manners of the ODG and the test oracle.

1. ODG

The API test apparatus may parse the API definition document, analyze parameters of APIs defined in the API definition document, and determine a dependency relationship between the parameters of the APIs. The dependency relationship between the parameters of the APIs indicates a reference relationship between the parameters of the API. For example, an output parameter of API 1 is an input parameter of API 2, an input of API 2 needs to refer to an output of API 1, and a dependency relationship exists between parameters of API 2 and API 1. That a dependency relationship exists between parameters indicates that a dependency relationship also exists between API operations. Therefore, the API test apparatus may generate the ODG based on the dependency relationship between the parameters of the APIs.

In this embodiment of this application, when generating the ODG, the API test apparatus may invoke an API document parser to input the API definition document to the API document parser to generate a readable API intermediate expression. Information included in the API intermediate expression may be the same as that included in the API definition document. A difference lies in that a format of the API intermediate expression is different from that of the API definition document. The format of the API intermediate expression is a format that facilitates subsequent data processing. A manner of converting the API definition document into the API intermediate expression enables API definition documents of different formats to generate API intermediate expressions of a unified data format after format conversion. This facilitates subsequent data processing, and further extends an application scope of embodiments of this application.

A manner API intermediate expression conversion is not limited in embodiments of this application. Any conversion manner in which a data format can be unified is applicable to embodiments of this application.

Figures 4A, 4B:
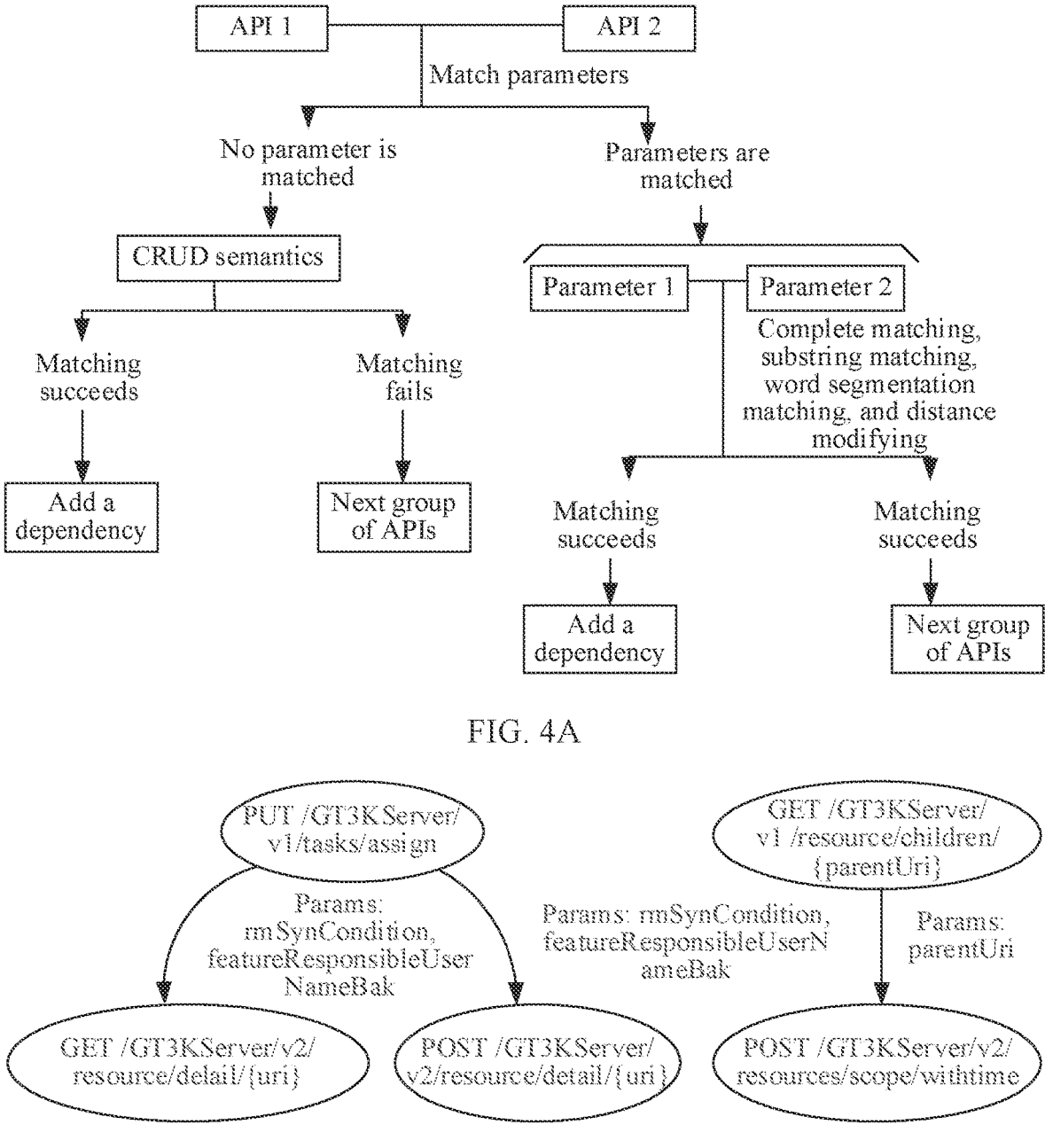
FIG. 4A is a schematic diagram of a method for determining a dependency relationship between APIs according to this application.
FIG. 4B is a schematic diagram of an ODG according to this application.

Refer to FIG. 4A. After generating the API intermediate expression, the API test apparatus may generate the ODG based on the API intermediate expression. When generating the ODG based on the API intermediate expression, the API test apparatus may analyze different APIs included in the API intermediate expression, construct a dependency relationship between the parameters of the APIs through complete matching of parameter names (that is, the parameter names are same), substring matching (that is, a parameter name is a substring of another parameter), word segmentation matching (that is, parameter noun stems are same), distance modifying (that is, modifying a distance between two parameter names to be smaller than a default value), and create, read, update, and delete (CRUD) semantics (that is, creating, obtaining, modifying, and deleting rules for a same resource), and generate the ODG based on the dependency relationship between the parameters of the APIs. FIG. 4B is a schematic diagram of an ODG.

For example, in FIG. 4A, establishing a dependency between API 1 and API 2 is used as an example for description. First, matching is performed on parameters in API 1 and API 2. If no parameter is matched, whether a dependency relationship exists between API 1 and API 2 is determined based on CRUD semantic matching. If the matching is successful through CRUD semantic matching, a dependency is added. For example, if API 1 creates a resource A and API 2 modifies the resource A, a dependency exists between a creating operation of API 1 and a modifying operation of API 2, and the dependency between the creating operation of API 1 and the modifying operation of API 2 is added. If the matching fails through the CRUD semantic matching, for example, API 1 and API 2 do not perform an operation on a same resource, it indicates that no dependency exists between API and API 2, and the matching continues to be performed on a next group of APIs.

If parameters are matched, further matching is performed on the parameters. In FIG. 4A, parameter 1 and parameter 2 are used as an example. Parameter 1 determines a parameter of API 1, and parameter 2 is a parameter of API 2. Whether parameter name complete matching, substring matching, word segmentation matching, distance calculating and modifying, or the like, exists between parameter 1 and parameter 2 is determined. If the matching is successful, a dependency is added. If the matching fails, the matching continues to be performed on a next group of APIs.

2. Test Oracle

The API test apparatus may invoke an oracle (Oracle) miner to analyze the API definition document, and output the test oracle.

Figure 4C:
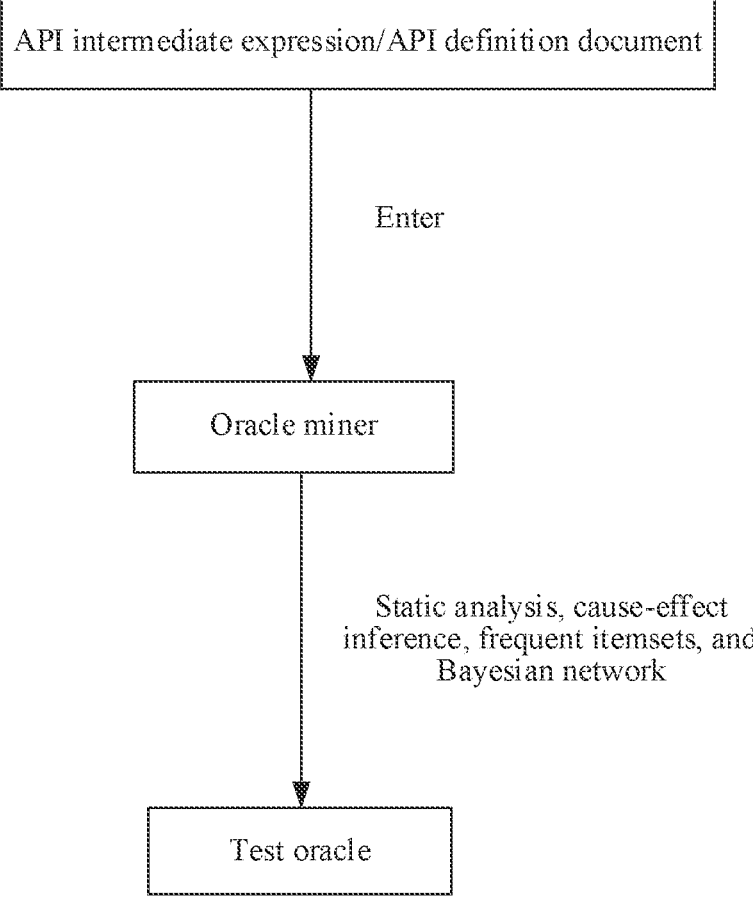
FIG. 4C is a schematic diagram of a method for generating a test oracle according to this application.

Refer to FIG. 4C. When analyzing the API definition document, the oracle miner may perform static analysis, cause-effect inference on the API definition document or the API intermediate expression, analyze distribution of frequent itemsets, and output the test oracle with reference to a Bayesian network.

In this embodiment of this application, the test oracle can be obtained by analyzing the API definition document. That is, the test oracle complies more with the API definition document, and the test oracle does not need to be manually configured. This can effectively reduce human intervention, ensure accuracy of the test oracle, and further ensure that an efficient test case is generated.

Step 303: The API test apparatus may generate a test case set based on the configuration information and the ODG. The test case set includes at least one test case. FIG. 4D is a schematic diagram of a test case.

Refer to FIG. 4E. If the configuration information indicates that the test case is applied to a scenario in which an API is normally invoked, the API test apparatus may traverse the ODG to generate the test case set based on the ODG. The API test apparatus may define an execution sequence of API operations based on a dependency relationship between the API operations in the ODG, and may further determine a parameter data instance of an API request initiated when the API is invoked. The parameter data instance may be randomly configured by the API test apparatus, or may be configured based on a parameter constraint recorded in the API definition document, so that the parameter data instance complies with the parameter constraint.

If the configuration information indicates that the test case is applied to a scenario in which an API is normally invoked, the API test apparatus may perform cross-mutation on the ODG based on the ODG, that is, change the dependency relationship between the API operations defined by the ODG, and generate a test case set based on the ODG obtained after cross-mutation. The API test apparatus may define an execution sequence of API operations based on a dependency relationship between the API operations in the ODG obtained after cross-mutation, and may further determine a parameter data instance of an API request initiated when the API is invoked. The parameter data instance may be randomly configured by the API test apparatus, or may be configured based on a preconfigured mutator (mutator)

bundle. The mutator may indicate whether an input parameter or an output parameter of the API is negated, whether a parameter type is changed, specify that numerical type parameters exceed upper and lower bounds, indicate whether a parameter is allowed to be missing, change a data structure in the API (copy a subnode, delete a subnode, and modify a subnode), whether to allow a special encoding format as a parameter value, whether to change a parameter name, and the like.

It should be noted that, if the configuration information includes the API blocklist, a test case in the test case set complies with the API blocklist in the configuration information. That is, the test case in the test case set does not detect the APIs in the API blocklist. If the configuration information includes the API parameter blocklist, the test case in the test case set complies with the API parameter blocklist in the configuration information. That is, the test case in the test case set does not detect the API parameters in the API parameter blocklist. If the configuration information includes the API trustlist, the test case in the test case set complies with the API trustlist in the configuration information. That is, the test case in the test case set detects the APIs in the API trustlist. If the configuration information includes the API parameter trustlist, the test case in the test case set complies with the API parameter trustlist in the configuration information. That is, the test case in the test case set detects the API parameters in the API parameter trustlist.

Step 304: The API test apparatus triggers a service node to execute the test case in the test case set, and obtains an API request initiated by the service node in a process of executing the test case and a corresponding API response. If the environment information is defined in the configuration information, the service node complies with the environment information.

The API test apparatus may deliver the test case in the test case set to the service node, and instruct the service node to execute the test case. When the service node executes the test case, the service node may invoke, based on the test case, an API involved in the test case, initiate an API request based on a parameter data instance that indicates an API request in the test case, and perform information interaction with a tested service node. That is, the service node sends the API request to the tested service node, and receives an API response from the tested service node. The API test apparatus may obtain the API request and the API response.

Step 305: The API test apparatus determines a target test case based on the API request initiated by the service node in the process of executing the test case, the corresponding API response, and the test oracle, where the target test case is a test case that does not match the test oracle and that is in the test case set. That is, an API request initiated when the target test case is executed and a corresponding API response do not match the test oracle.

Figure 4F:
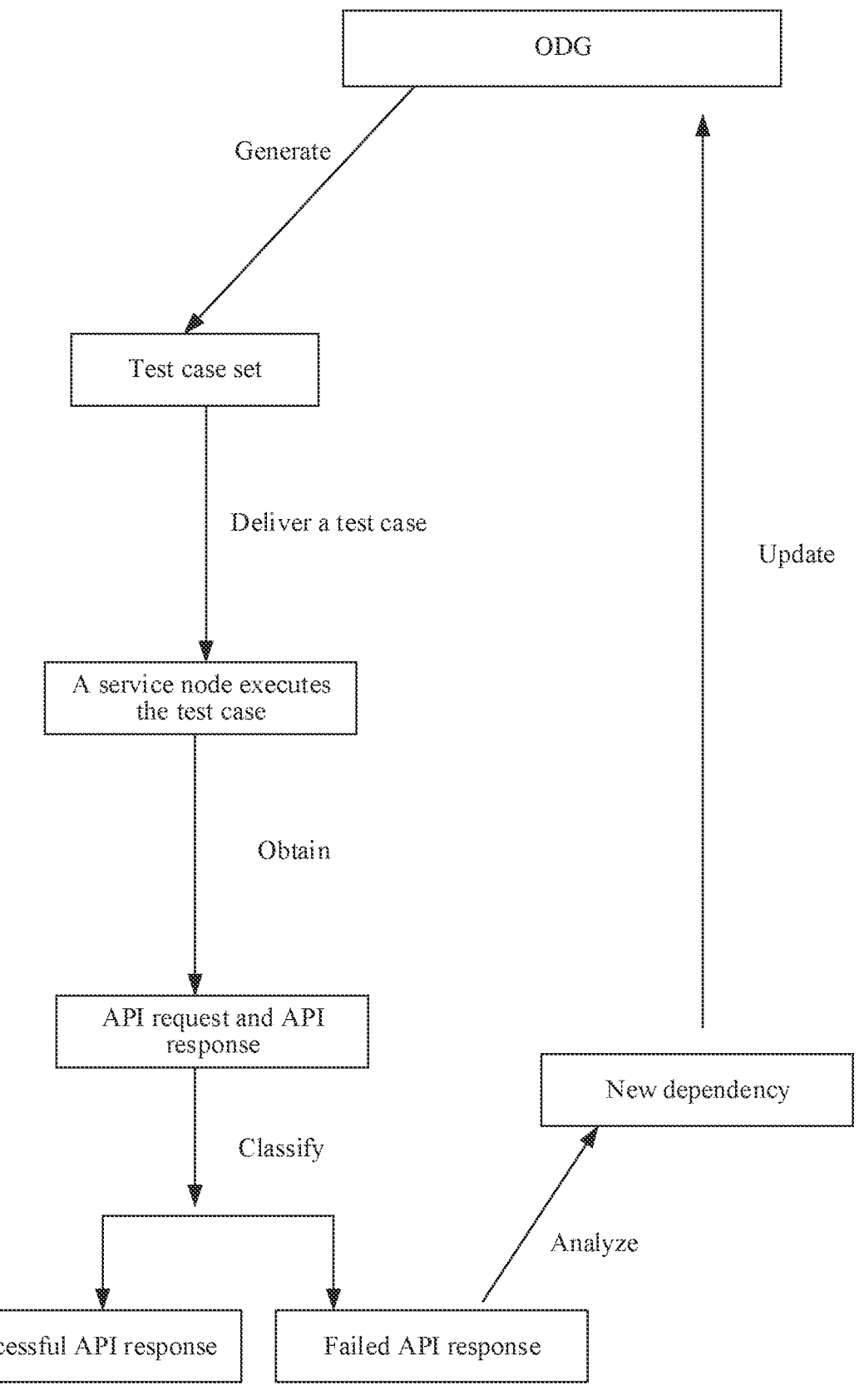
FIG. 4F is a schematic diagram of a method for updating an ODG according to this application.

Refer to FIG. 4F. The API test apparatus may classify API responses corresponding to API requests into two types based on the test oracle. One type is a successful API response, the successful API response is an API response that complies with the test oracle, and the successful API response may include a response 200 or a response 400. One type is a failed API response, where the failed API response is an API response that does not comply with the test oracle, and the failed API response may be a response 500.

Step 306: The API test apparatus updates the ODG based on the target test case, and may perform step 303 to step 305 based on the updated ODG.

When updating the ODG based on the target test case, the API test apparatus may perform iterative splitting by using the target test case, generate a plurality of sub-test cases based on the target test case, and extract a successful sub-test case and a failed sub-test case. The successful sub-test case indicates that an API request initiated during execution of the sub-test case is, for example, an API request that complies with the test oracle, and a corresponding API response is a successful API response, including the response 200, or the response 400. The failed sub-test case indicates that an API request initiated during execution of the sub-test case is, for example, an API request that does not comply with the test oracle, and a corresponding API response is a failed API response, including the responses 500. Then, a plurality of successful sub-test cases may be combined, or a plurality of failed sub-test cases may be combined, or the successful sub-test cases and the failed sub-test cases may be combined, and the service node is triggered to execute combined test cases for testing, and determine a dependency relationship between API operations based on a test result.

Figure 4G:
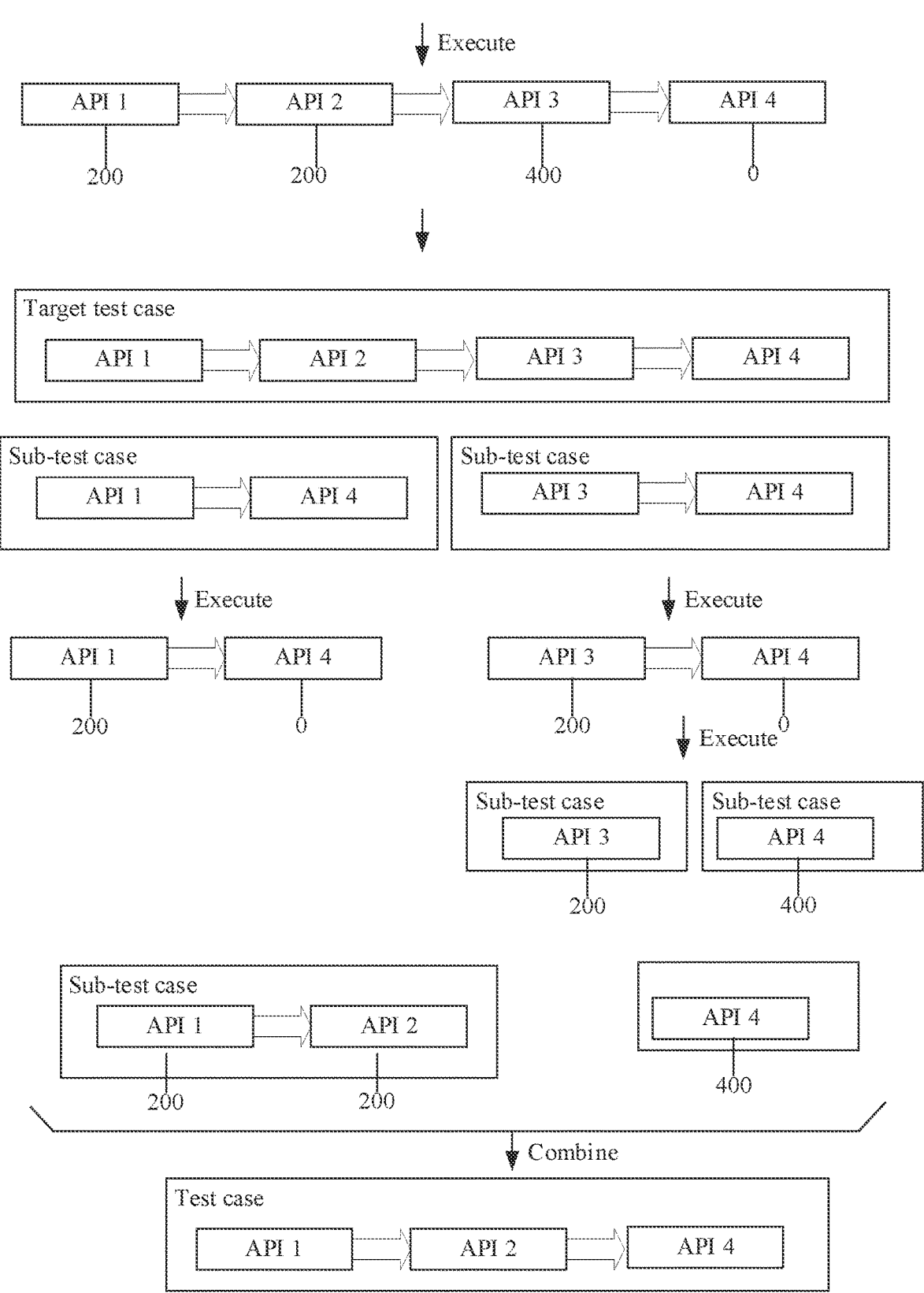
FIG. 4G is a schematic diagram of a method for discovering a new API dependency relationship according to this application.

Refer to FIG. 4G. An API test sequence in the target test case is that API 1 is first tested, API 2 is then tested, API 3 is then tested, and API 4 is then tested. When the service node executes the target test case, API responses of API 1 and API 2 are responses 200, an API response of API 3 is the response 400, and an API response of API 4 is the failed API response that does not comply with the test oracle. In FIG. 4G, 0 indicates a failed API response that does not comply with the test oracle. The target test case is divided into two sub-test cases: a sub-test case for testing API 1 and API 4, and a sub-test case for testing API 3 and API 4. In a process in which the service node executes the sub-test cases for testing API 1 and API 4, API responses of API 1 and API 2 are a response 200 and a failed API response (not a response 200) that does not comply with the test oracle. The sub-test case for testing API 1 and API 4 is a failed sub-test case. In a process in which the service node executes the sub-test cases for testing API 3 and API 4, an API response of API 3 is a response 200, and an API 3 response of API 4 is a failed API response that does not comply with the test oracle. The sub-test case for testing API 3 and API 4 is a failed sub-test case. The sub-test case for testing API 3 and API 4 continues to be split into a sub-test case for testing API 3 and a sub-test case for testing API 4. When the service node executes the sub-test case for testing API 3, an API response of API 3 is a response 200, which is a successful sub-test case. In a process in which the service node executes the sub-test case for testing API 4, an API response of API 4 is a response 400, and the sub-test case for testing API 4 is combined with the sub-test case for testing API 1 and API 2. The dependency relationship between the API operations is determined based on a result of a combined test case executed by the service node. If the result of the combined test case indicates that an API response matches the test oracle, it indicates that a new dependency relationship exists between the API operations and can be updated to the ODG. Otherwise, the ODG is not updated.

The API test apparatus may directly present the test case set to the user, or the API test apparatus may continue to execute a target test case determining process one or more times. When executing a next target test case set determining process, the API test apparatus may update the ODG by using a target test case determined last time, and perform step 303 to step 305 based on the updated ODG. A test case set is generated in each target test case set determining process. In other words, the API test apparatus may iteratively perform a plurality of target test case determining processes, a target test case determined in each iteration process may be used to update the ODG, and then the updated ODG may be used in a next iteration, that is, the API test apparatus may perform step 306.

Step 306: The API test apparatus updates the ODG based on the target test case, and the API test apparatus generates a next target test case by using the updated ODG, that is, performs step 303 to step 305 by using the updated ODG.

The API test apparatus may perform step 303 to step 306 for a plurality of times, that is, the API test apparatus performs a plurality of iterations. A quantity of iterations performed by the API test apparatus is not limited in embodiments of this application. The quantity of iterations may be preconfigured. If the quantity of iterations of the API test apparatus reaches a preconfigured quantity value, the API test apparatus may stop iteration.

The API test apparatus may also constrain the quantity of iterations by using an iteration time, and if a time of the plurality of iterations of the API test apparatus reaches a preset time value, the API test apparatus may stop iteration, and provide a matching status of an API request initiated in a process of executing a test case in each iteration process and an API response and the test oracle to the user.

Step 307: The API test apparatus may summarize the API request initiated in the process of executing the test case in each iteration process and the API response, to generate a test report. The test report may include the matching status of the API request initiated in the process of executing the test case and the API response and the test oracle, and may further include a test case set.

If the test case coverage information needs to be provided for execution in the configuration information, the API test apparatus may further analyze the test case set, and generate the coverage information of the test case in the test case set, where the test case coverage information may be used as a part of the test report.

Step 308: The API test apparatus provides the test report to the user. If the test case coverage information needs to be provided for execution in the configuration information, the test further includes the coverage information of the test case.

The following describes a manner of generating the coverage information of the test case. The API test apparatus may generate the coverage information of the test case by using black-box feedback and/or gray-box feedback.

The gray-box feedback means that in a process in which a test case is executed, the API test apparatus collects coverage information of the test case, for example, class coverage, method coverage, module coverage, line coverage, and branch coverage. A code coverage feedback unit (for example, Java Coverage Agent) in the providing module in the API test apparatus may be configured to collect the coverage information of the test case.

Figure 4H:
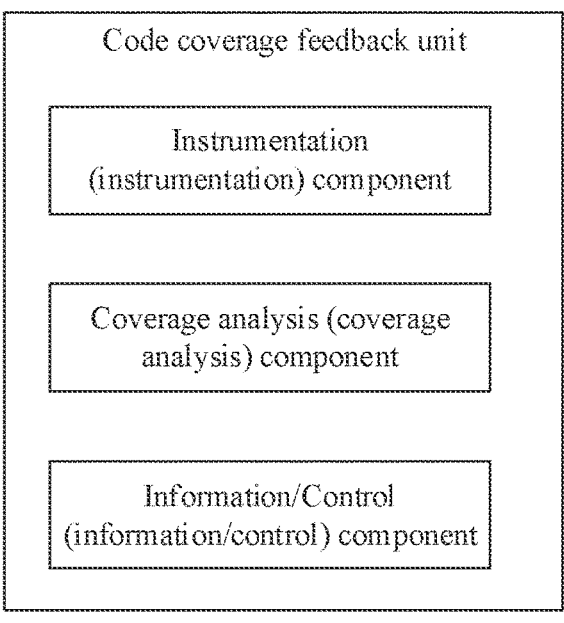
FIG. 4H is a schematic diagram of a structure of a code coverage feedback unit according to this application.

A structure of the code coverage feedback unit is shown in FIG. 4H. The code coverage feedback unit mainly includes three components: an instrumentation (instrumentation) component, a coverage analysis (coverage analysis) component, and an information/control (information/control) component. First, the code coverage feedback unit inserts a probe into the test case. When program is executed and touches the probe, execution information is recorded for further analysis. For stability reasons, the code coverage feedback unit reuses a probe mechanism of Jacoco, but improves on probe insertion, to allow selective instrumentation based on a level of detail in collection of the coverage information provided by the user. Therefore, a quantity of inserted probes can be reduced, thereby improving a program execution speed. After collecting original probe information, the code coverage feedback unit needs to compare content of class (class) files to generate detailed coverage information. In this embodiment of this application, the code coverage feedback unit is allowed to cache a piece of uninstrumented class content after a class of a tested program is loaded into a memory. Through this mechanism, the original probe information can be collected and analyzed automatically to generate the final coverage information without user intervention. Finally, the code coverage feedback unit can display the collected coverage information in a variety of ways. It is allowed to invoke an interface to provide coverage information display, collection, and display services. That is, it is allowed to query coverage information.

The black-box feedback is used to analyze an API response, such as a status code, a response header, and a message body of the API response, to generate API coverage information (such as scenario coverage, API method coverage information, and API generation coverage information) at an API granularity.

It should be noted that, in this embodiment of this application, the coverage information of the test case may be used in a plurality of rounds of iterations in addition to being displayed to the user. In each round of iteration process, the API test apparatus may generate coverage information of a test case in a test case set generated in the round of iteration process. The API test apparatus may further filter the test case set based on the coverage information for the test case. The API test apparatus can mutate filtered test cases by using a genetic algorithm, to generate a group of new test cases. The group of new test cases can be added to a next round of iteration, for example, added to a test case set generated in the next round of iteration as a part of the test case set; and continue to be delivered to the service node, to trigger the service node to execute the test case set.

For example, the API test apparatus filters the test case set based on a preset target function (which may be understood as a coverage condition). In this embodiment of this application, the target function may score the test case based on a factor such as the coverage information of the test case. The API test apparatus may retain a test case whose score is higher than a preset threshold, and discard a test case whose score is lower than the preset threshold.

Certainly, in a possible scenario, the API test apparatus may not further filter the test case set based on the coverage information of the test case, but directly mutate the test case in the test case set in a current iteration by using the genetic algorithm, to generate a group of new test cases. The group of new test cases can be added to a next round of iteration as a part of a test case set generated during the next round of iteration.

Because the test case set includes a plurality of test cases, no matter whether the API test apparatus performs a plurality of iterations, a quantity of API responses corresponding to API requests that are obtained by the API test apparatus may be relatively large, and the API responses corresponding to the API request are classified by the API test apparatus into successful API responses and failed API responses during processing. A plurality of API responses in the failed API responses can also be clustered, API responses with a same failure reason or a same failure location can be grouped into one class, and the failure reason or the failure location can be marked. For example, the API test apparatus may classify the response 500 into one class. In a case in which the API responses are inconsistent with the test oracle, further classification may be performed based on locations of inconsistencies (that is, failure locations), and APIs with a same failure location are classified into one class.

To facilitate viewing by the user, when providing the matching status between the API response in the process of executing the test case in the test case set and the test oracle to the user, the API test apparatus may present API responses after classification and clustering to the user. For a failed API response, the API test apparatus may further display a failure cause or a failure location of the API response when displaying the API response.

Optionally, the API test apparatus may further generate a script of the test case based on a selection of the user.

The user may browse the test case in displayed test cases, select one or more test cases from the test cases, and instruct the API test apparatus to generate a text of a selected test case and a script of the test case by using the client.

The text of the test case describes a test object, a test prerequisite, a test procedure, and an expected result in natural language. The script of the test case describes a test object, a test method, a test service parameter instance, and a test environment parameter instance in program executable language. A test script can be automatically executed by a test executor Agent.

In the second manner, the API test apparatus generates the test case based on the API traffic data.

In the second manner, after obtaining the API traffic data, the API test apparatus generates an operation transfer probability graph based on the API traffic data, and generates the test case and a test oracle based on the operation transfer probability graph. The API test apparatus may further deliver the test case to a service node to trigger the service node to execute the test case, obtain an API request initiated by the service node in a process of executing the test case and a corresponding API response, analyze the API request and the corresponding API response based on the test oracle, and generate the test report. The test report includes a matching status between the API request and the corresponding API response and the test oracle, and may further include coverage information of the test case and/or the test case.

The API test apparatus may further provide the test report to the user by using a client, and the user confirms the test report. Alternatively, the API test apparatus may select a target test case based on the test report, and generate a target test case script, so that the target test case can be reused.

Figure 5:
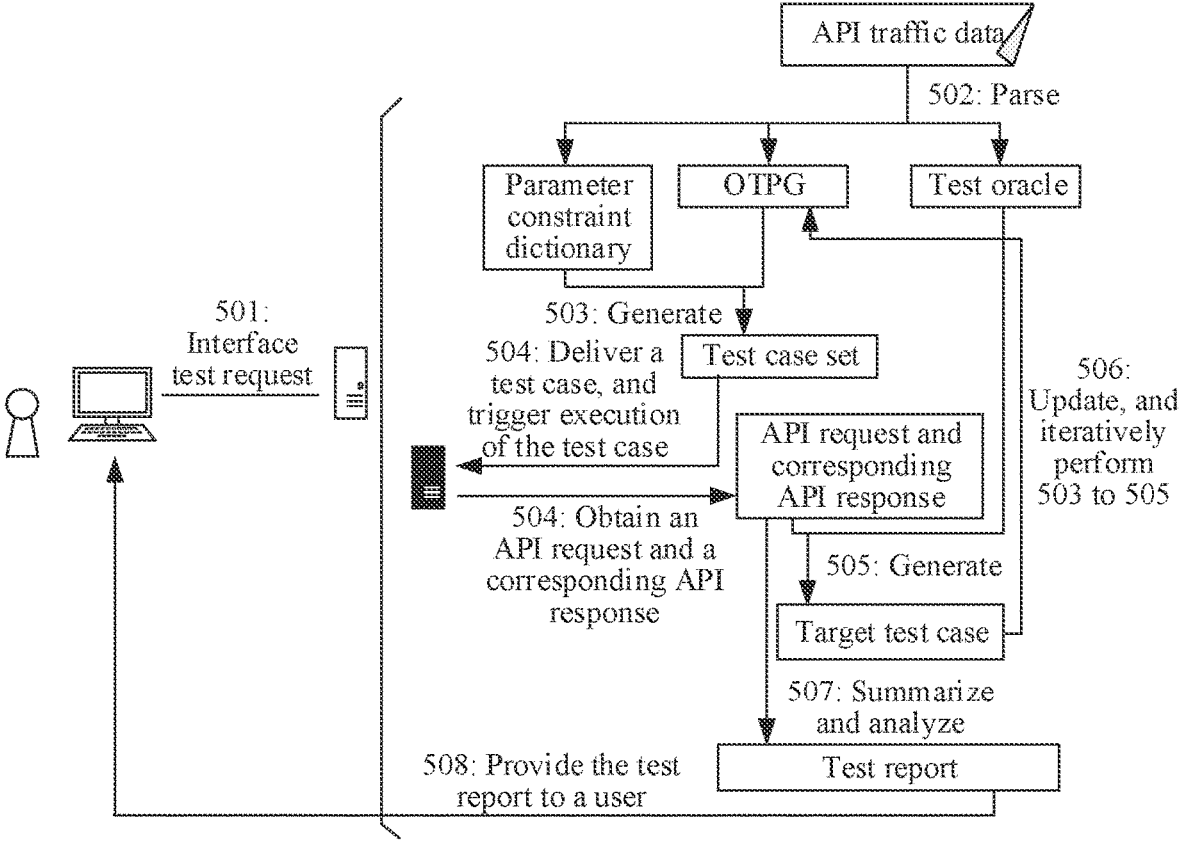
FIG. 5 is a schematic diagram of an API test method according to this application.

With reference to FIG. 5, the following describes a manner of generating an application interface test case according to an embodiment of this application.

Step 501: A user sends an interface test request to an API test apparatus by using a client, where the interface test request carries API traffic data. Optionally, the interface test request may further carry configuration information of the user.

For description of the configuration information, refer to foregoing descriptions. Details are not described herein again. It should be noted that, in this scenario, the configuration information may further include sensitive information, which is personal privacy information that may be involved in the API traffic data, such as a user account, a password, and an IP address.

An execution manner of step 501 is not limited in this embodiment of this application. For example, the user may create a test task on the client, upload the API traffic data, and enter the configuration information of the test case. After detecting an operation of the user, the client may send an interface test request to the API test apparatus.

Step 502: After receiving the test interface test request, the API test apparatus may parse the API traffic data, and generate the operation transfer probability graph, the test oracle, and a parameter constraint dictionary. FIG. 6A is a schematic diagram of an operation transfer probability graph.

When parsing the API traffic data, the API test apparatus may further perform data cleaning on the API traffic data. For example, sensitive information in the API process data may be deleted. If the configuration information includes an API blocklist, the API test apparatus may delete, from the API traffic data, an API request initiated when an API in the API blocklist is invoked and a corresponding API response. If the configuration information includes an API trustlist, the API test apparatus may retain an API request initiated when an API in the API trustlist is invoked and a corresponding API response that are in the API traffic data. If the configuration information includes an API parameter blocklist, the API test apparatus may delete a parameter in the API parameter blocklist from the API traffic data. If the configuration information includes an API parameter trustlist, the API test apparatus may retain a parameter in the API parameter trustlist in the API traffic data.

Then, the operation transfer probability graph and the test oracle may be generated based on the cleaned API traffic data. In step 502, the operation transfer probability graph and the test oracle need to be generated. The following separately describes generation manners of the operation transfer probability graph and the test oracle.

1. Operation Transfer Probability Graph

The API test apparatus can analyze the API traffic data through parameter matching (for example, parameter values are equal) and CRUD semantic analysis (for example, creating, obtaining, modifying, and deleting rules for a same resource), to generate the operation transfer probability graph.

A manner in which the API test apparatus analyzes the API traffic data to generate the operation transfer probability graph is similar to a manner in which the API test apparatus analyzes the API definition document to generate an operation dependency graph. The API test apparatus may determine, by analyzing the API traffic data, a dependency relationship between parameters of APIs through parameter matching and CRUD semantic analysis. In this way, a dependency relationship between API operations is determined.

The API test apparatus may further determine a dependency probability between the API operations based on a quantity of times of occurrences of APIs having a dependency relationship in the API traffic data.

2. Test Oracle

The API test apparatus may invoke an oracle (Oracle) miner to analyze the API traffic data, and output the test oracle.

When analyzing the API traffic data, the oracle miner may perform static analysis, cause-effect inference on the API traffic data, analyze distribution of frequent itemsets, and output the test oracle with reference to a Bayesian network.

3. Parameter Constraint Dictionary

The parameter constraint dictionary records a value range or a value of an API parameter, and may record a dependency relationship between parameters. For example, the dependency relationship between the parameters can occur at the same time or not at the same time.

The API test apparatus may determine a distribution status of a value of each parameter of the API and an occurrence status of the parameter based on the API traffic data, and further generate the parameter constraint dictionary.

Step 503: The API test apparatus may generate a test case set based on the parameter constraint dictionary, the configuration information, and the operation transfer probability graph. The test case set includes at least one test case. FIG. 6B is a schematic diagram of a test case.

If the configuration information indicates that the test case is applied to a scenario in which an API is normally invoked, the API test apparatus may traverse the operation transfer probability graph to generate the test case set based on the operation transfer probability graph. The API test apparatus may define an execution sequence of API operations based on a dependency relationship between API operations in the operation transfer probability graph, and may further determine a parameter data instance of an API request initiated when the API is invoked. The parameter data instance may be randomly configured by the API test apparatus, or may be configured based on the parameter constraint dictionary, so that the parameter data instance complies with the parameter constraint dictionary.

If the configuration information indicates that the test case is applied to the scenario in which the API is normally invoked, the API test apparatus may generate the test case set based on an abnormal dependency relationship (for example, a dependency relationship found in an abnormal invoking case) recorded in the operation transfer probability graph. Optionally, the API test apparatus may further constrain the test case set. For example, the API test apparatus may further mutate a parameter related to a test case in the test case set by using a mutation operator. A specific type of the mutation operator is not limited in this embodiment of this application.

It should be noted that, if the configuration information includes the API blocklist, a test case in the test case set complies with the API blocklist in the configuration information. That is, the test case in the test case set does not detect the APIs in the API blocklist. If the configuration information includes the API parameter blocklist, the test case in the test case set complies with the API parameter blocklist in the configuration information. That is, the test case in the test case set does not detect the API parameters in the API parameter blocklist. If the configuration information includes the API trustlist, the test case in the test case set complies with the API trustlist in the configuration information. That is, the test case in the test case set detects the APIs in the API trustlist. If the configuration information includes the API parameter trustlist, the test case in the test case set complies with the API parameter trustlist in the configuration information. That is, the test case in the test case set detects the API parameters in the API parameter trustlist.

Step 504: The API test apparatus triggers a service node to execute the test case in the test case set, and obtains an API request initiated by the service node in a process of executing the test case and a corresponding API response. If a service environment domain name is defined in the configuration information, the service node is a node in the service environment domain name. If a service environment node is defined in the configuration information, the service node may be the service environment node defined in the configuration information. For details, refer to the related description of step 304. Details are not described herein again.

Step 505: The API test apparatus determines a target test case based on the API request initiated by the service node in the process of executing the test case, the corresponding API response the test oracle, where the target test case is a test case that does not match the test oracle and that is in the test case set. For details, refer to the related description of step 305. Details are not described herein again.

A manner in which the API test apparatus updates the operation transfer probability graph based on the target test case is similar to a manner in which the ODG is updated based on the target test case in step 306. For details, refer to foregoing descriptions. Details are not described herein again.

The API test apparatus may directly present the test case set to the user, or the API test apparatus may continue to execute a target test case determining process one or more times. When executing a next target test case set determining process, the API test apparatus may update the operation transfer probability graph by using a target test case determined last time, and then perform step 303 to step 305 based on the updated operation transfer probability graph. A test case set is generated in each target test case set determining process. In other words, the API test apparatus may iteratively perform a plurality of target test case determining processes, a target test case determined in each iteration process may be used to update the operation transfer probability graph, and then the updated operation transfer probability graph may be used in a next iteration, that is, the API test apparatus may perform step 506.

Step 506: The API test apparatus updates the operation transfer probability graph based on the target test case, and step 503 to step 505 may be performed based on the updated operation transfer probability graph. For details, refer to the related description of step 306. Details are not described herein again.

Step 507: The API test apparatus may summarize the API request initiated in the process of executing the test case in each iteration process and the API response, to generate a test report. The test report may include the matching status of the API request initiated in the process of executing the test case and the API response and the test oracle, and may further include a test case set. For details, refer to the related description of step 307. Details are not described herein again.

Step 508: The API test apparatus provides the test report to the user. If the test case coverage information needs to be provided for execution in the configuration information, the test further includes the coverage information of the test case. For details, refer to the related description of step 308. Details are not described herein again.

In the third manner, the API test apparatus generates the test case based on the API definition document and the API traffic data.

In the third manner, after obtaining the API definition document and the API traffic data, the API test apparatus generates an API operation relationship graph based on the API definition document and the API traffic data, and generates the test case and a test oracle based on the API operation relationship graph and the API traffic data. The API test apparatus may further deliver the test case to a service node to trigger the service node to execute the test case, obtain an API request initiated by the service node in a process of executing the test case and a corresponding API response, determine the API request and the corresponding API response based on the test oracle, and generate the test report. The test report includes a matching status between the API request and the corresponding API response and the test oracle, and may further include coverage information of the test case.

The API test apparatus may further provide the test report to the user by using a client, and the user confirms the test report. Alternatively, the API test apparatus may select the test case based on the test report, and generate a test case script, so that the test case can be reused.

Figure 7:
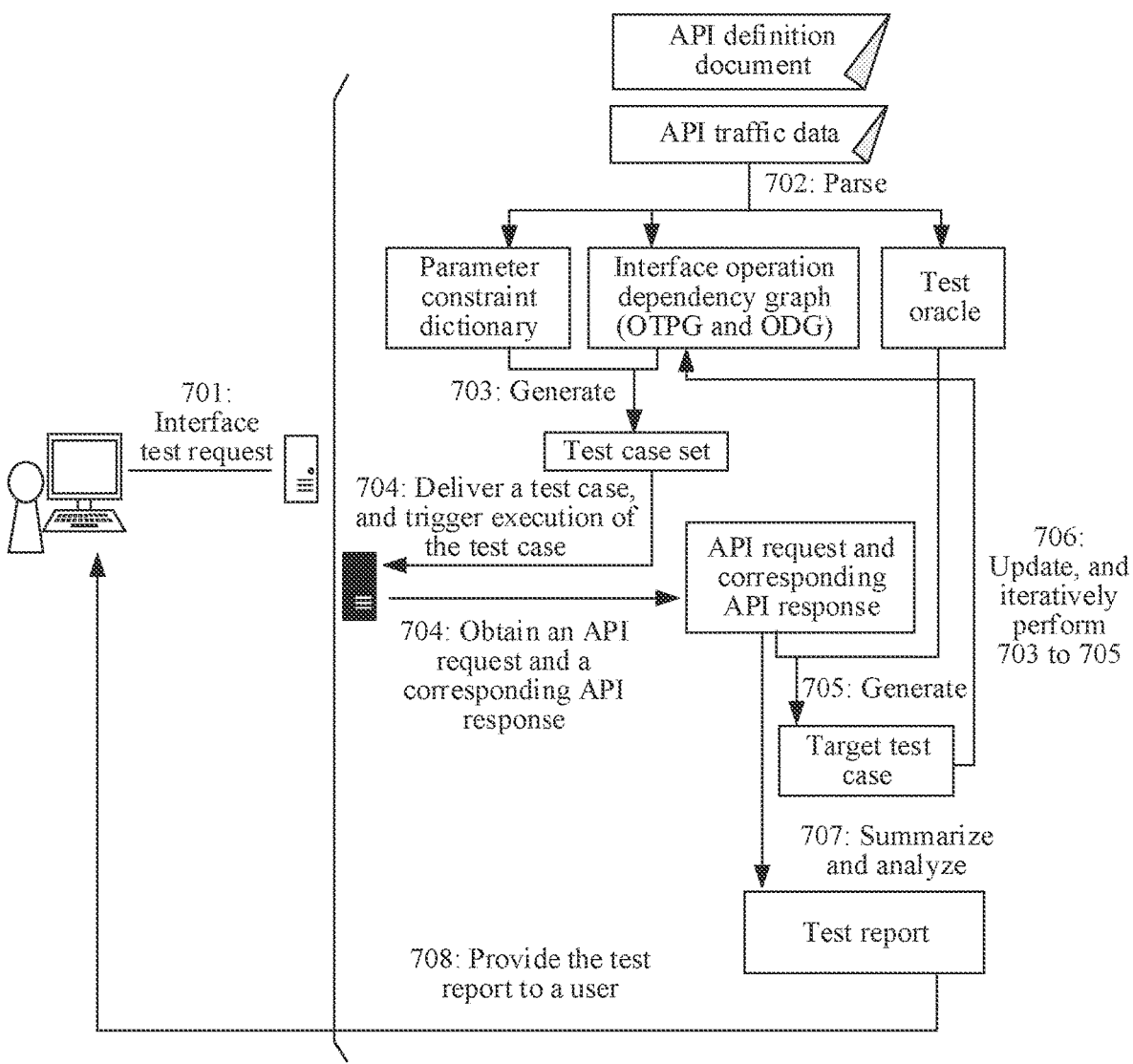
FIG. 7 is a schematic diagram of an API test method according to this application.

With reference to FIG. 7, the following describes a manner of generating an application interface test case according to an embodiment of this application.

Step 701: A user sends an interface test request to an API test apparatus by using a client, where the interface test request carries API traffic data and an API definition document. Optionally, the interface test request may further carry configuration information of the user.

For description of the configuration information, refer to foregoing descriptions. Details are not described herein again.

An execution manner of step 701 is not limited in this embodiment of this application. For example, the user may create a test task on the client, upload the API traffic data, API definition document, and select or enter the configuration information. After detecting an operation of the user, the client may send an interface test request to the API test apparatus.

Step 702: After receiving the interface test request, the API test apparatus may parse the API traffic data and the API definition document, and generate the API operation relationship graph, the test oracle, and a parameter constraint dictionary. The API operation relationship graph is a graph combining an operation dependency graph and an operation transfer probability graph. That is, the API test apparatus may parse the API traffic data to generate the operation transfer probability graph, and parse the API definition document to generate the operation dependency graph. After the operation dependency graph and the operation transfer probability graph are generated, the operation dependency graph and the operation transfer probability graph are combined (that is, a union set is obtained), to generate the API operation relationship graph.

When parsing the API traffic data, the API test apparatus may further perform data cleaning on the API traffic data. For a data cleaning manner, refer to the foregoing description. Details are not described herein again. For generating manners of the operation transfer probability graph, the operation dependency graph, the test oracle, and the parameter constraint dictionary, refer to the foregoing description. Details are not described herein again.

In this manner, because the API operation relationship graph includes information in the operation dependency graph and the operation transfer probability graph, information in the API operation relationship graph is more abundant, and it is ensured that an efficient test case can be generated subsequently.

Step 703: The API test apparatus may generate a test case set based on the parameter constraint dictionary, the configuration information, and the API operation relationship graph. The test case set includes at least one test case. The API test apparatus generates a test case set based on the configuration information and the API operation relationship graph. Refer to related descriptions of step 303 and step 503.

Step 704: The API test apparatus triggers a service node to execute the test case in the test case set, and obtains an API request initiated by the service node in a process of executing the test case and a corresponding API response. If a service environment domain name is defined in the configuration information, the service node is a node in the service environment domain name. If a service environment node is defined in the configuration information, the service node may be the service environment node defined in the configuration information. For details, refer to the related description of step 304. Details are not described herein again.

Step 705: The API test apparatus determines a target test case based on the API request initiated by the service node in the process of executing the test case, the corresponding API response the test oracle, where the target test case is a test case that does not match the test oracle and that is in the test case set. For details, refer to the related description of step 305. Details are not described herein again.

Step 706: The API test apparatus updates the API operation relationship graph based on the target test case, and step 703 to step 705 may be performed based on an updated API operation relationship graph. For details, refer to the related description of step 306. Details are not described herein again.

A manner in which the API test apparatus updates the API operation relationship graph based on the target test case is similar to a manner in which the ODG is updated based on the target test case in step 306. For details, refer to foregoing descriptions. Details are not described herein again.

The API test apparatus may directly use the target test case as a final test case and present the target test case to the user. The API test apparatus may also continue to perform a process of determining the target test case one or more times. When executing determining the target test case next time, the API test apparatus may update the API operation relationship graph by using a target test case determined last time, and then perform step 703 to step 305 based on the updated API operation relationship graph. In other words, a process in which the API test apparatus generates the final test case may be an iteration process, a target test case determined in each iteration process may be used to update the API operation relationship graph, and then the updated API operation relationship graph may be used in a next iteration, that is, the API test apparatus may perform step 706.

Step 707: The API test apparatus may summarize the API request initiated in the process of executing the test case in each iteration process and the API response, to generate a test report. The test report may include the matching status of the API request initiated in the process of executing the test case and the API response and the test oracle, and may further include a test case set. For details, refer to the related description of step 307. Details are not described herein again.

Step 708: The API test apparatus provides the test report to the user. If the test case coverage information needs to be provided for execution in the configuration information, the test further includes the coverage information of the test case. For details, refer to the related description of step 308. Details are not described herein again.

Figure 8:
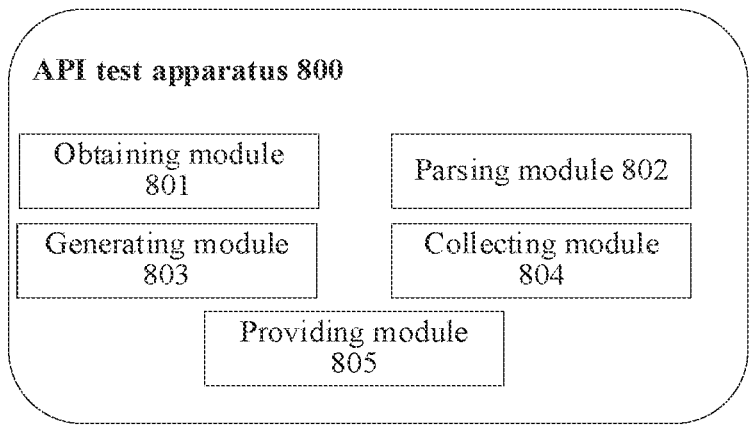
FIG. 8 is a schematic diagram of a structure of an API test apparatus according to this application.

Based on a same invention concept as the method embodiment, an embodiment of this application further provides an API test apparatus. The API test apparatus is configured to perform the method performed by the API test apparatus in the foregoing method embodiment. As shown in FIG. 8, the API test apparatus 800 includes an obtaining module 801, a parsing module 802, a generating module 803, a collecting module 804, and a providing module 805. Specifically, in the API test apparatus, a connection is established between modules through a communication channel.

The obtaining module 801 is configured to obtain an application programing interface API file transmitted by a user, where the API file includes an API definition document and/or API traffic data, the API definition document includes API description information, and the API traffic data includes an API request initiated when an API is invoked and an API response corresponding to the API request.

The parsing module 802 is configured to parse the API file, to generate an API operation relationship graph and a test oracle, where the API operation relationship graph describes a dependency relationship of API operations, and the test oracle is a prediction rule of the API request initiated when the API is invoked and the corresponding API response.

The generating module 803 is configured to generate a first test case set based on the API operation relationship graph.

The collecting module 804 is configured to: trigger a service node to execute a test case in the first test case set, and obtain an API request initiated by the service node in a process of executing the test case in the first test case set and a corresponding API response.

The providing module 805 is configured to: determine a matching status between the API request initiated in the process of executing the test case in the first test case set and the corresponding API response and the test oracle; and provide the user with the matching status between the test oracle and the API request initiated in the process in which the test case in the first test case set is executed and the corresponding API response.

In a possible implementation, the API test apparatus may perform a plurality of rounds of iterations, and each round of iteration takes an output of a previous round of iteration as an input. The following uses a subsequent round of iteration as an example for description.

In this round of iteration, the generating module 803 may determine a target test case from the first test case set based on the test oracle, where an API request initiated when the target test case is executed, and an API response do not match the test oracle. Then, the parsing module 802 updates the API operation relationship graph based on the target test case, and generates a second test case set based on an updated API operation relationship graph. Then, the collecting module 804 may trigger the service node to execute a test case in the second test case set, and obtain an API request initiated by the service node in a process of executing the test case in the second test case set and an API response. The providing module 805 may determine, based on the test oracle, a matching status between the API request initiated by the service node in the process of executing the test case in the second test case set and the corresponding API response and the test oracle, and provide the user with the matching status between the test oracle and the API request initiated in the process in which the test case in the second test case set is executed and the corresponding API response.

In a possible implementation, when the API file includes the API traffic data, when parsing the API file of the API, the parsing module 802 may generate the API operation relationship graph and a parameter constraint dictionary, where the parameter constraint dictionary includes a value range of an API parameter.

In a possible implementation, a parameter of an API request defined by a test case in the first test case set complies with the parameter constraint dictionary.

In a possible implementation, the obtaining module 801 may further obtain configuration information of the user, where the configuration information indicates a rule that needs to be followed by a test case, and the configuration information includes some or all of the following information:

a test scenario of the test case, an API blocklist or trustlist, an API parameter blocklist or trustlist, and information indicating whether to provide coverage information of a test case.

In a possible implementation, the test case in the first test case set complies with the configuration information.

In a possible implementation, the providing module 805 may further determine coverage information of the test case in the first test case set, where the coverage information of the test case describes a coverage status of the test case on the API; and provide the coverage information of the test case to the user.

In a possible implementation, the API test apparatus may further perform another iteration manner. In this iteration manner, the API test apparatus may also perform a plurality of rounds of iterations, and each round of iteration takes an output of a previous round of iteration as an input. The following uses a subsequent round of iteration as an example for description.

In this round of iteration, the generating module 803 may determine a candidate test case set from the first test case set, where coverage information of a test case in the candidate test case set meets a preset coverage condition; and generate a derivative test case set based on the candidate test case set. Then, the collecting module 804 may trigger the service node to execute a test case in the derivative test case set, and obtain an API request initiated by the service node in a process of executing the test case in the derivative test case set and an API response. The providing module 805 may determine, based on the test oracle, a matching status between the API request initiated by the service node in a process of executing the test case in the derived test case set and the API response and the test oracle, generate a test report, and display the test report.

Division into modules in this embodiment of this application is an example, is only logical function division, and may be other division during actual implementation. In addition, function modules in embodiments of this application may be integrated into one processor, or each of the modules may exist alone physically, or two or more modules may be integrated into one module. The integrated module may be implemented in a form of hardware, or may be implemented in a form of a software function module.

If the integrated module is implemented in a form of a software function module and is sold or used as an independent product, the integrated module may be stored in a computer-readable storage medium. Based on such an understanding, the technical solutions of this application essentially, or the part contributing to the conventional technology, or all or a part of the technical solutions may be embodied in a form of a software product. The computer software product is stored in a storage medium, and includes several instructions for instructing a terminal device (which may be a personal computer, a mobile phone, a network device, or the like) or a processor (processor) to perform all or some steps of the method in embodiments of this application. The foregoing storage medium includes: any medium that can store program code, such as a USB flash drive, a removable hard disk, a read-only memory (ROM), a random access memory (RAM), a magnetic disk, or an optical disc.

Figure 9:
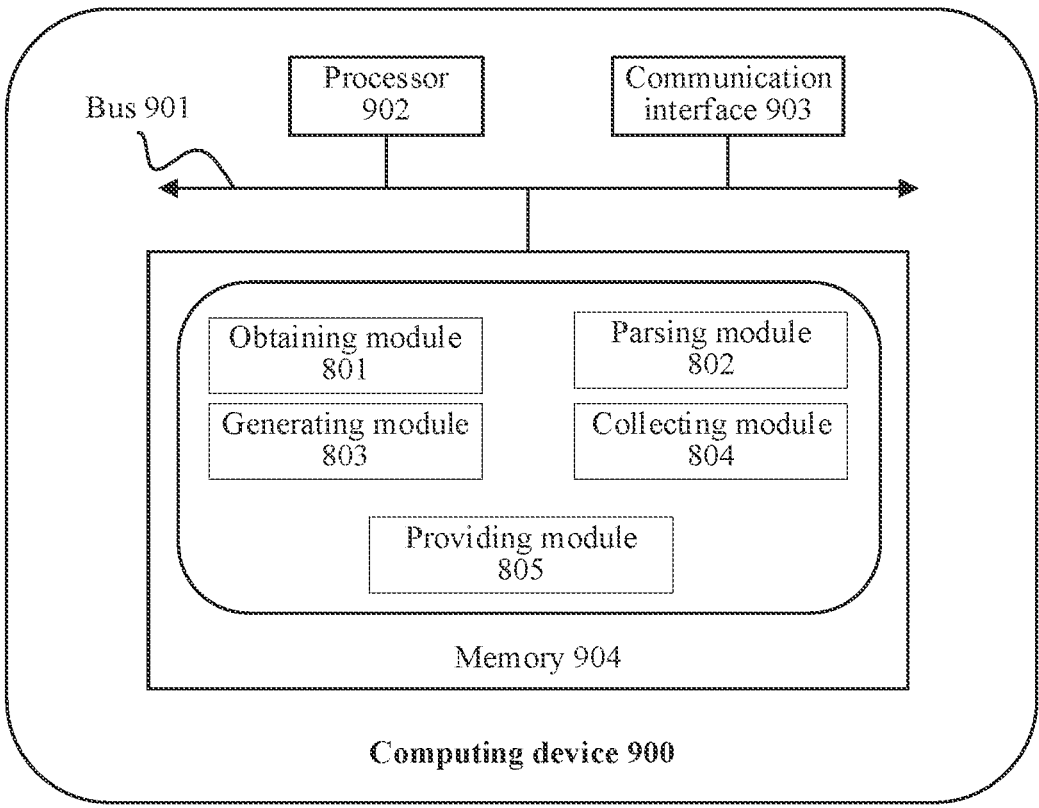
FIG. 9 and FIG. 10 are schematic diagrams of structures of computing devices according to this application.

This application further provides a computing device 900 shown in FIG. 9. The computing device 900 includes a bus 901, a processor 902, a communication interface 903, and a memory 904. The processor 902, the memory 904, and the communication interface 903 communicate with each other by using the bus 901.

The processor 902 may be a central processing unit (CPU). The memory 904 may include a volatile memory (volatile memory), for example, a random access memory (RAM). The memory 904 may further include a non-volatile memory (non-volatile memory), for example, a read-only memory (ROM), a flash memory, an HDD, or an SSD. The memory stores executable code, and the processor 902 executes the executable code to perform the methods described in FIG. 3, FIG. 5, and FIG. 7. The memory 904 may further include another software module (for example, a plurality of modules in the API test apparatus 800) required for another running process, such as an operating system. The operating system may be LINUX™, UNIX™, WINDOWS™, or the like.

Figure 10:
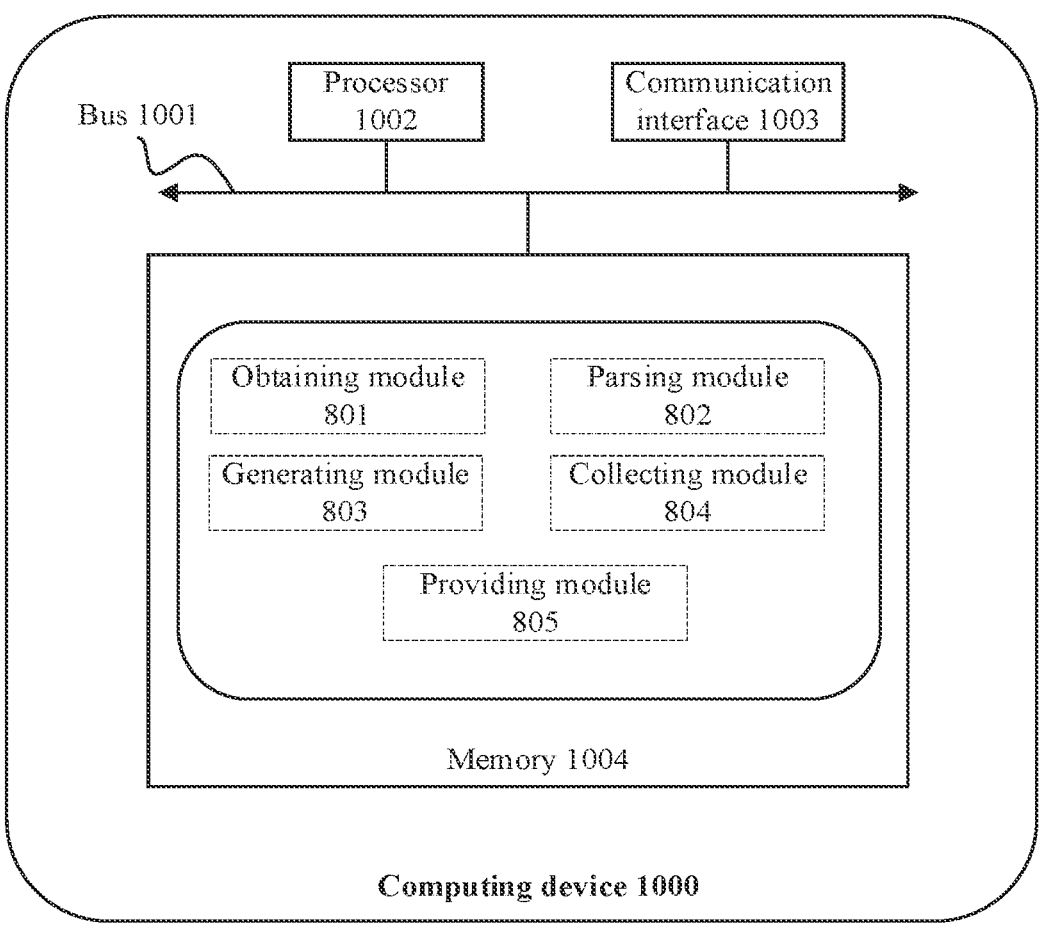

This application further provides a computing device system. The computing device system includes at least one computing device 1000 shown in FIG. 10. The computing device 1000 includes a bus 1001, a processor 1002, a communication interface 1003, and a memory 1004. The processor 1002, the memory 1004, and the communication interface 1003 communicate with each other by using the bus 1001. At least one computing device 1000 in the computing device system performs communication by using a communication path.

The processor 1002 may be a CPU. The memory 1004 may include a volatile memory, for example, a random access memory. The memory 1004 may further include a nonvolatile memory, for example, a read-only memory, a flash memory, an HDD, or an SSD. The memory 1004 stores executable code, and the processor 1002 executes the executable code to perform any part or all of the methods described in FIG. 3, FIG. 5, and FIG. 7. The memory may further include another software module required for another running process, such as an operating system. The operating system may be LINUX™, UNIX™, WINDOWS™, or the like.

The at least one computing device 1000 in the computing device system establishes communication with each other by using a communication network, and each computing device 1000 runs any one or more modules in the API test apparatus 800.

The descriptions of procedures corresponding to the foregoing accompanying drawings have respective focuses. For a part that is not described in detail in a procedure, refer to related descriptions of another procedure.

All or a part of the foregoing embodiments may be implemented by software, hardware, firmware, or any combination thereof. When software is used to implement the embodiments, all or a part of the embodiments may be implemented in a form of a computer program product. The computer program product includes computer program instructions. When the computer program instructions are loaded and executed on a computer, all or some of the processes or functions shown in FIG. 3, FIG. 5, and FIG. 7 according to embodiments of the present invention are generated.

The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An application programming interface (API) testing method performed by a computing device, the method comprising:

obtaining an API file transmitted by a user, the API file comprising an API definition document or API traffic data, the API definition document comprising API description information, and the API traffic data comprising an API request initiated when an API is invoked and an API response corresponding to the API request;

parsing the API file to generate an API operation relationship graph and a test oracle, the API operation relationship graph describing a dependency relationship of API operations, and the test oracle is a prediction rule of the API request initiated when the API is invoked and the corresponding API response;

obtaining configuration information of the user, the configuration information indicating a rule to be followed by a test case, and the configuration information comprises: a test scenario of the test case, an API blocklist or trustlist, an API parameter blocklist or trustlist, or information indicating whether to provide coverage information of a test case;

generating a first test case set based on the API operation relationship graph and the configuration information, the test case in the first test case set complying with the configuration information;

triggering a service node to execute the test case in the first test case set;

obtaining an API request initiated by the service node in a process of executing the test case in the first test case set and a corresponding API response; and providing the user with a matching status between the test oracle and the API request initiated in the process of executing the test case in the first test case set and the corresponding API response.

2. The method according to claim 1, further comprising:

determining a target test case from the first test case set based on the test oracle, wherein an API request initiated when the target test case is executed and an API response do not match the test oracle;

updating the API operation relationship graph based on the target test case, and generating a second test case set based on an updated API operation relationship graph;

triggering the service node to execute a test case in the second test case set;

obtaining an API request initiated by the service node in a process of executing the test case in the second test case set and an API response; and providing the user with a matching status between the test oracle and the API request initiated in the process of executing the test case in the second test case set and the corresponding API response.

3. The method according to claim 1, wherein the API file comprises the API traffic data, and the step of parsing the API file to generate an API operation relationship graph comprises:

parsing the API file, to generate the API operation relationship graph and a parameter constraint dictionary, wherein the parameter constraint dictionary comprises a value range of an API parameter.

4. The method according to claim 3, wherein a parameter of an API request defined by a test case in the first test case set complies with the parameter constraint dictionary.

5. The method according to claim 1, further comprising:

determining coverage information of the test case in the first test case set, wherein the coverage information of the test case in the first test case set describes a coverage status of the test case on the API; and providing the coverage information of the test case to the user.

6. The method according to claim 5, further comprising:

determining a candidate test case set from the first test case set, wherein coverage information of a test case in the candidate test case set meets a preset coverage condition;

generating a derivative test case set based on the candidate test case set; and triggering the service node to execute a test case in the derivative test case set, and obtaining an API request initiated by the service node in a process of executing the test case in the derivative test case set and an API response.

7. A computing device for application programming interface (API) testing, the computing device comprising:

a memory storing instructions; and at least one processor in communication with the memory, the at least one processor configured, upon execution of the instructions, to perform the following steps obtain an API file transmitted by a user, the API file comprising an API definition document or API traffic data, the API definition document comprising API description information, and the API traffic data comprising an API request initiated when an API is invoked and an API response corresponding to the API request;

parse the API file to generate an API operation relationship graph and a test oracle, the API operation relationship graph describing a dependency relationship of API operations, and the test oracle is a prediction rule of the API request initiated when the API is invoked and the corresponding API response;

obtain configuration information of the user, the configuration information indicating a rule to be followed by a test case, and the configuration information comprises: a test scenario of the test case, an API blocklist or trustlist, an API parameter blocklist or trustlist, or information indicating whether to provide coverage information of a test case;

generate a first test case set based on the API operation relationship graph and the configuration information, the test case in the first test case set complying with the configuration information;

trigger a service node to execute the test case in the first test case set;

obtain an API request initiated by the service node in a process of executing the test case in the first test case set and a corresponding API response; and provide the user with a matching status between the test oracle and the API request initiated in the process in which the test case in the first test case set is executed and the corresponding API response.

8. The computing device according to claim 7, wherein the processor is further configured to:

determine a target test case from the first test case set based on the test oracle, wherein an API request initiated when the target test case is executed and an API response do not match the test oracle;

update the API operation relationship graph based on the target test case, and generate a second test case set based on an updated API operation relationship graph;

trigger the service node to execute a test case in the second test case set, and obtain an API request initiated by the service node in a process of executing the test case in the second test case set and an API response; and provide the user with a matching status between the test oracle and the API request initiated in the process in which the test case in the second test case set is executed and the corresponding API response.

9. The computing device according to claim 7, wherein the API file comprises the API traffic data, and the processor is configured to parse the API file to generate the API operation relationship graph by:

parsing the API file to generate the API operation relationship graph and a parameter constraint dictionary, wherein the parameter constraint dictionary comprises a value range of an API parameter.

10. The computing device according to claim 9, wherein a parameter of an API request defined by a test case in the first test case set complies with the parameter constraint dictionary.

11. The computing device according to claim 7, wherein the processor is further configured to: determine coverage information of the test case in the first test case set, wherein the coverage information of the test case in the first test case set describes a coverage status of the test case on the API; and provide the coverage information of the test case to the user.

12. The computing device according to claim 11, wherein the processor is configured to:

determine a candidate test case set from the first test case set, wherein coverage information of a test case in the candidate test case set meets a preset coverage condition; and generate a derivative test case set based on the candidate test case set; and trigger the service node to execute a test case in the derivative test case set, and obtain an API request initiated by the service node in a process of executing the test case in the derivative test case set and an API response.

13. A non-transitory computer-readable media storing computer instructions for application programming interface (API) testing that configure at least one processor, upon execution of the instructions, to perform the following steps:

obtain an API file transmitted by a user, the API file comprising an API definition document or API traffic data, the API definition document comprising API description information, and the API traffic data comprising an API request initiated when an API is invoked and an API response corresponding to the API request;

parse the API file to generate an API operation relationship graph and a test oracle, the API operation relationship graph describing a dependency relationship of API operations, and the test oracle is a prediction rule of the API request initiated when the API is invoked and the corresponding API response;

obtain configuration information of the user, the configuration information indicating a rule to be followed by a test case, and the configuration information comprises: a test scenario of the test case, an API blocklist or trustlist, an API parameter blocklist or trustlist, or information indicating whether to provide coverage information of a test case;

generate a first test case set based on the API operation relationship graph and the configuration information, the test case in the first test case set complying with the configuration information;

trigger a service node to execute the test case in the first test case set;

obtain an API request initiated by the service node in a process of executing the test case in the first test case set and a corresponding API response; and provide the user with a matching status between the test oracle and the API request initiated in the process in which the test case in the first test case set is executed and the corresponding API response.

14. The non-transitory computer-readable media according to claim 13, wherein the computing device is further caused to:

determine a target test case from the first test case set based on the test oracle, wherein an API request initiated when the target test case is executed and an API response do not match the test oracle;

update the API operation relationship graph based on the target test case, and generate a second test case set based on an updated API operation relationship graph;

trigger the service node to execute a test case in the second test case set;

obtain an API request initiated by the service node in a process of executing the test case in the second test case set and an API response; and provide the user with a matching status between the test oracle and the API request initiated in the process in which the test case in the second test case set is executed and the corresponding API response.

15. The non-transitory computer-readable media according to claim 13, wherein the API file comprises the API traffic data, and the computing device is caused to parse the API file to generate the API operation relationship graph and a test oracle by:

parsing the API file, to generate the API operation relationship graph and a parameter constraint dictionary, wherein the parameter constraint dictionary comprises a value range of an API parameter.

16. The non-transitory computer-readable media according to claim 15, wherein a parameter of an API request defined by a test case in the first test case set complies with the parameter constraint dictionary.

* * * * *